(12) United States Patent
Matsusaka et al.

(10) Patent No.: US 7,982,968 B2
(45) Date of Patent: Jul. 19, 2011

(54) VARIABLE-POWER OPTICAL SYSTEM, IMAGE PICKUP DEVICE, AND DIGITAL APPARATUS

(75) Inventors: Keiji Matsusaka, Osaka (JP); Soh Ohzawa, Toyonaka (JP); Yasunari Fukuta, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 123 days.

(21) Appl. No.: 12/518,319

(22) PCT Filed: Nov. 27, 2007

(86) PCT No.: PCT/JP2007/072823
§ 371 (c)(1),
(2), (4) Date: Jun. 9, 2009

(87) PCT Pub. No.: WO2008/072466
PCT Pub. Date: Jun. 19, 2008

(65) Prior Publication Data
US 2010/0033834 A1 Feb. 11, 2010

(30) Foreign Application Priority Data
Dec. 14, 2006 (JP) ................................ 2006-337359

(51) Int. Cl.
*G02B 15/14* (2006.01)
(52) U.S. Cl. ........................................ 359/686; 359/684
(58) Field of Classification Search .................. 359/686, 359/680–682, 684
See application file for complete search history.

(56) References Cited

U.S. PATENT DOCUMENTS

| | | | |
|---|---|---|---|
| 5,644,434 A | 7/1997 | Hagimori | 359/689 |
| 5,963,377 A | 10/1999 | Okada et al. | 359/686 |
| 7,304,805 B2 * | 12/2007 | Endo et al. | 359/690 |
| 2002/0044362 A1 | 4/2002 | Watanabe et al. | 359/689 |
| 2004/0027685 A1 * | 2/2004 | Mihara et al. | 359/686 |
| 2004/0130647 A1 | 7/2004 | Kuba | 348/335 |
| 2005/0046963 A1 | 3/2005 | Adachi | 359/689 |
| 2005/0243438 A1 * | 11/2005 | Hamano et al. | 359/692 |
| 2006/0262422 A1 | 11/2006 | Ohashi | 359/687 |
| 2007/0014025 A1 | 1/2007 | Yokoyama | 359/642 |
| 2007/0229968 A1 * | 10/2007 | Satori et al. | 359/676 |

FOREIGN PATENT DOCUMENTS

| | | |
|---|---|---|
| JP | 07-311339 A | 11/1995 |
| JP | 11-109230 A | 4/1999 |
| JP | 2001-319311 A | 11/2001 |
| JP | 2004-205796 A | 7/2004 |
| JP | 2005-55725 A | 3/2005 |
| JP | 2005-275280 A | 10/2005 |
| JP | 2006-301416 A | 11/2006 |
| JP | 2006-308957 A | 11/2006 |
| WO | WO 2008/072466 | 6/2008 |

* cited by examiner

*Primary Examiner* — Jordan M. Schwartz
(74) *Attorney, Agent, or Firm* — Sidley Austin LLP

(57) ABSTRACT

A variable-power optical system includes, in order from an object side thereof: a first lens group with a negative optical power; a second lens group with a positive optical power; and a third lens group with a negative optical power, where an interval between the first lens group and the second lens group decreases when a power of the variable-power optical system varies from a wide-angle end to a telephoto end. The first lens group comprises a negative lens and a positive lens. The second lens group consists of a positive lens and a negative lens, and includes at least one aspheric surface. The variable-power optical system satisfies the predetermined conditional expressions.

17 Claims, 17 Drawing Sheets

VARIABLE-POWER OPTICAL SYSTEM, IMAGE PICKUP DEVICE, AND DIGITAL APPARATUS

RELATED APPLICATIONS

This application is a U.S. National Stage Phase Application under 35 U.S.C. 371 of International Application No. PCT/JP2007/072823, filed with the Japanese Patent Office on Nov. 27, 2007, which is based on Japanese Patent Application No. 2006-337359.

TECHNICAL FIELD

The present invention relates to a variable-power optical system including a plurality of lens groups wherein power is varied by changing a space between lens groups in an optical axis direction, an image pickup device equipped with this variable-power optical system, and a digital apparatus with this image pickup device mounted thereon, particularly to a variable-power optical system suited for extremely miniaturized configurations.

BACKGROUND ART

In recent years, there has been a remarkable spread of mobile phones and PDAs (Personal Digital Assistant). It has become a common practice to incorporate a compact digital still camera unit and digital video unit in such devices. These devices are characterized by severe restrictions on the size and cost. Therefore, there has been generally used a small-sized image pickup device equipped with a smaller number of pixels than that in a normal digital still camera, and a unifocal optical system including about one to three plastic lenses. In the image pickup device mounted on a mobile information terminal, technology is advancing rapidly toward a further increase in pixel level and functional level. In this context, there has been an intense demand for a compact variable-power optical system compatible with an image pickup element of high pixel level and capable of capturing the image of a subject located far away from a user, wherein this variable-power optical system can be mounted on a mobile phone and others.

The Patent Literature 1 discloses a three-component variable-power optical system with negative-positive-positive components wherein movement of a lens group resulting from varying power is minimized by increasing the varying-power load of the second lens group. The disclosed optical system, however, uses three lenses for each of the first and second lens groups, and a compact configuration is not sufficiently achieved in the optical system.

The Patent Literature 2 discloses a three-component variable-power optical system with negative-positive-negative components wherein compact configuration is realized by statically positions the first lens group. In the proposed optical system, however, the power arrangement in the first lens group and lens material of the second lens group are not optimized. Correction of the astigmatism and chromatic aberration is insufficient.

The Patent Literature 3 proposes a four-component variable-power optical system with negative-positive-negative-positive components, a so-called light bending optical system wherein the optical axis is bent perpendicularly and the optical unit is designed to have a slim configuration. However, this system contains as many as seven to nine lenses including the prism for bending the optical axis, and this results in increased costs. Although an attempt for thin configuration has been made, the overall length of the optical system is excessive, and efforts toward compact configuration are insufficient in terms of unit volume.

Patent Literature 1: Japanese Unexamined Patent Application Publication No. 2001-318311
Patent Literature 2: Japanese Unexamined Patent Application Publication No. 2005-55725
Patent Literature 3: Japanese Unexamined Patent Application Publication No. 2004-205796

DISCLOSURE OF INVENTION

Technical Problem

In the conventional variable-power optical system proposed so far, efforts for compact configuration are insufficient in terms of unit volume, as viewed from the number of lenses used and the traveling amount of lenses for varying the power. If a further attempt is made for compact configuration of the variable-power optical system, a problem in aberration correction has arisen.

In view of the prior art problems described above, it is an object of the present invention to provide a variable-power optical system, image pickup device and digital apparatus capable of meeting both requirements for satisfactory correction of such aberrations as chromatic aberration and astigmatism, and extremely compact configuration of a variable-power optical system.

Solution to Problem

To solve the aforementioned technical problems, the present invention provides a variable-power optical system, image pickup device and digital apparatus having the following configuration. The terms used in the following description of this Specification are defined as follows:

(a) Refractive index indicates a value with respect to the wavelength of the d line (587.56 nm).

(b) Abbe number is defined as value νd obtained from the following formula when the refractive indexes with respect to the d line, F line (486.13 nm) and C line (656.28 nm) are assumed as nd, nF and nC, and the Abbe number is assumed as νd:

$$\nu d = (nd-1)/(nF-nC)$$

(c) The representation for a surface shape is based on paraxial curvature.

(d) Optical power for each of single lenses constituting a cemented lens is defined as a optical power when both sides of a surface of each single lens are assumed as being occupied with air.

(e) Aspheric sag is defined as a parameter representing a difference between a distance in the direction of optical axis between the tip of a lens surface and a point on an aspheric curve with respect to the maximum effective radius, and a spherical sag based on a paraxial curvature.

(f) A resin material used for a complex type aspheric lens (a lens formed in an aspheric shape by coating a spherical glass material as a substrate with a thin resin material) has only an additional function of the substrate glass material. Accordingly, this material is not handled as an independent optical member. It will be handled in the same manner as when the substrate glass material has an aspheric surface, and the number of lenses is assumed as one. In this case, the refractive index of the glass material as a substrate is employed as a refractive index of the lens.

(g) In a light bending optical system, prisms are included in counting the lenses.

(h) The terms "concave", "convex", and "meniscus" used with respect to lenses are defined as representing the shape of the lenses in the vicinity of the optical axis (in the vicinity of the center of the lens) (as a representation based on the paraxial curvature).

1. A variable-power optical system comprising, in order from an object side thereof: a first lens group with a negative optical power; a second lens group with a positive optical power; and a third lens group with a negative optical power, wherein an interval between the first lens group and the second lens group decreases when a power of the variable-power optical system varies from a wide-angle end to a telephoto end, the first lens group comprises a negative lens and a positive lens, the second lens group consists of a positive lens and a negative lens, and includes at least one aspheric surface, and the variable-power optical system satisfies the following conditional expressions (1) through (4).

$$TLw/TLt<1.2 \qquad (1)$$

$$\Delta N2>0.15 \qquad (2)$$

$$\Delta v2>20 \qquad (3)$$

$$Lb/fw \leq 1.2 \qquad (4)$$

In the expressions, TLw and TLt are distances on an optical axis from a tip of a lens surface arranged at a closest position to the object side to an image plane, at a wide-angle end (w) and a telephoto end (t) respectively, when an object is placed at an infinite distance, $\Delta N2$ is a difference in refractive indexes of lenses in the second lens group, $\Delta v2$ is a difference in Abbe numbers of lenses in the second lens group, Lb is a distance (length in terms of air) on the optical axis from a tip of a lens surface with a power arranged at a closest position to an image side, to an image plane at the telephoto end, and fw is a composite focal length of a total optical system at the wide-angle end.

This configuration is provided as a so-called negative-lead optical system, in which the first lens group located closest to the object has a negative optical power. This ensures that a quick reduction in angle of light coming from the object side at a large angle is provided by the negative optical power of the first lens group, and the overall optical length and the front lens diameter are reduced in terms of size, which are advantageous. Further, in the negative-lead configuration, an increase in error sensitivity can be reduced even when the compact configuration of the optical system is achieved. These advantages are conspicuous in a zoom lens having a variable-power ratio of about 2 to 4 times. Further, the first lens group includes at least one negative lens and one positive lens. This structure ensures the effective correction of chromatic aberration of magnification. Further, the second lens group composed of one negative lens and one positive lens as the minimum requirement for the correction of the longitudinal chromatic aberration and spherical aberration. This makes it possible to reduce the load of the drive apparatus of the second lens group required to move a longer distance when the power varies and to reduce the number of lenses, whereby the cost can be reduced. Further, at least one aspheric surface is included in the second lens group. This arrangement corrects a spherical aberration which increases as the optical power of the second lens group increases.

In view of the compact configuration and optical performance, the conditional equations (1) through (4) must be satisfied. If the TLw/TLt exceeds the upper limit of the conditional expression (1), the effective optical-path diameter of the lens closest to the object is required to increase in order to ensure illuminance on the peripheral of the image plane at the wide-angle end. This makes it difficult to reduce the size of the variable-power optical system in the direction of the outer diameter. If the $\Delta N2$ is below the lower limit of the conditional expression (2), a serious astigmatism will result from an increase in the Petzval's sum. If the $\Delta v2$ is below the lower limit of the conditional expression (3), correction of a longitudinal chromatic aberration will be insufficient. If the Lb/fw exceeds the upper limit of the conditional expression (4), it will be difficult to ensure satisfactory correction of both a astigmatism at the wide-angle end and a astigmatism at the telephoto end.

2. The variable-power optical system described in Item 1, wherein the second lens group satisfies the following conditional expression (5).

$$0.6<f2/fw<2.0 \qquad (5)$$

In the expression, f2 denotes the composite focal length of the second lens group.

The variable-power optical system satisfying the aforementioned conditional expression (5) can exhibit excellent optical performance and manufacturing ease. If the f2/fw exceeds the upper limit of the conditional expression (5), the optical power of the second lens group will be insufficient, and the variable-power ratio of about 2 to 4 times is hardly obtained while meeting the requirements of compact configuration in a variable-power optical system. In the meantime, if it is below the lower limit of the conditional expression (5), the sensitivity to the decentration error of the second lens group will be excessively high, and the degree of manufacturing difficulty will increase.

3. The variable-power optical system described in Item 1 or 2, wherein the variable-power optical system adjusts a focal point from an object at a infinite distance to an object to a near distance by moving the third lens group toward the image side, and the variable-power optical system satisfies the following conditional expression (6).

$$1.5<|f3/fw|<6.0 \qquad (6)$$

In the expression, f3 denotes the composite focal length of the third lens group.

Use of the third lens group for focusing ensures that a sharp image of the object at an area up to a near distance can be captured, without having to increase the overall optical length by movement of lenses or increase the front lens diameter. Further, if the conditional expression (6) is satisfied, a still excellent variable-power optical system can be provided in terms of the optical performance and manufacturing ease of the third lens group. If the f3/fw exceeds the upper limit of the conditional expression (6), the focusing movement of the third lens group will be increased. Thus, when a compact configuration is to be maintained, restriction will be imposed on the movement of a lens for varying the power, and a desired variable-power ratio is hardly obtained. In the meantime, if the f3/fw is below the lower limit of the conditional expression (6), the optical power of the third lens will be excessive and the sensitivity to the decentration error will be excessively high, which makes lens assembly difficult.

4. The variable-power optical system described in any one of the Items 1 through 3, wherein third lens group moves to form a locus in a convex shape projecting to the object side, when the power varies from the wide-angle end to the telephoto end, and the variable-power optical system satisfies and the following conditional expression (7).

$$|D3/(fw \times ft)^{1/2}|<1.5 \qquad (7)$$

In the expression, D3 denotes a displacement amount of the third lens group when the power varies from the wide-angle end to the telephoto end, and ft indicates the composite focal length of the total optical system at the telephoto end. When the power varies from the wide-angle end to the telephoto end, the third lens group moves so as to form a locus in a convex shape projecting to an object, whereby the load of the third lens group for varying the power is reduced. When the conditional expression (7) is satisfied, the sensitivity to the decentration error of the third lens group can be reduced. If the upper limit of the conditional expression (7) is exceeded, the optical power of the third lens will be excessive. It makes manufacturing of lenses difficult.

5. The variable-power optical system described in any one of Items 1 through 4, wherein the first lens group is statically positioned when the power varies from the wide-angle end to the telephoto end, and the variable-power optical system satisfies the following conditional expression (8).

$$0.1 < h1/TLw \quad (8)$$

In the expression, h1 is a radius of an effective optical path of a lens surface arranged at a closest position to the object side, at the wide-angle end.

According to the aforementioned structure, the first lens group is positioned to be fixed. This permits a substantial reduction in the load on the drive apparatus of the lens groups. When the first lens group is movable at the time of varying the power, the drive apparatus must be installed outside the first lens group. This causes the size to be increased in the direction of the outer diameter. Thus, fixing of the first lens group is very helpful in reducing the size in the direction of the outer diameter. Further, when the conditional expression (8) is satisfied, the optical performance of the first lens group is optimized. If h1/TLw is below the lower limit of the conditional expression (8), the optical power of the third lens will be excessive and the sensitivity to the decentration error will be excessively high. This requires adjustments to be made at the time of assembling, and results in an increase in production costs.

6. The variable-power optical system described in any one of Items 1 through 5, wherein in the first lens group and the interval between the first and second lens groups satisfy the following conditional expressions (9) and (10).

$$0.2 < T1/(fw \times ft)^{1/2} < 1.5 \quad (9)$$

$$T12/(fw \times ft)^{1/2} < 0.3 \quad (10)$$

In the expressions, T1 an axial thickness from a front lens surface of the first lens group to a rear lens surface of the first lens group, and T2 is an axial interval between the first lens group and the second lens group at the telephoto end.

If the conditional expressions (9) and (10) are satisfied, the structure of the first lens group and the space between the first and second lens groups can be further optimized. If the upper limit of the conditional expression (9) is exceeded, a substantial displacement amount of the second lens group for varying the power will be reduced, when a compact configuration is to be maintained. Thus, the optical power of the second lens group will be increased and the degree of manufacturing difficulty will increase. If the lower limit of the conditional expression (9) cannot be reached, an optical power of a negative lens in the first lens group will be reduced, and the principal point on the rear side will move away from the image plane. Thus, if an attempt is made to maintain the same focal length, the back focus is hardly ensured in relative terms. Further, it will be increasingly difficult to move the exit pupil away from the image plane. If the upper limit of the conditional expression (10) is exceeded, a substantial displacement amount of the second lens group for varying the power will be reduced, when an attempt is made to maintain a compact overall optical length. Thus, the optical power of the second lens group will be increased and the degree of manufacturing difficulty will increase.

7. The variable-power optical system described in any one of Items 1 through 6, further comprising: an aperture stop arranged on the object side of the second lens group, wherein an aperture diameter of the aperture stop is fixed.

In this structure, an aperture stop is provided on the object side of the second light source. This arrangement can minimize the diameter of the front lens of the first lens group. In the meantime, the space between the first and second lens groups has a greater impact on the overall optical length. If an attempt is made to increase this space in order to insert a variable stop mechanism in position, the overall optical length will have to be increased by two or three times, for example. To solve this problem, the aperture diameter is fixed so as to simplify the stop member. This arrangement allows the thickness to be reduced in the direction of the optical axis.

8. The variable-power optical system described in Item 7, further comprising: a device adjusting a light amount arranged on the image side of the second lens group.

When the light-amount adjusting device is to be installed, it is preferably installed at the stop position wherein all light fluxes pass through one and the same position, in order to avoid irregularity of light amount between the center of the image plane and the periphery. In the meantime, the space between the first and second lens groups has a greater impact on the overall optical length. If an attempt is made to increase this space, the overall optical length may be increased by two or three times. This makes it difficult to install a thicker light-amount adjusting device at the stop position. To solve this problem, the light-amount adjusting device is installed on the image side of the second lens group. This arrangement ensures the irregularity of light amount to be reduced to almost the same level as that at the stop position, and provides satisfactory compact configuration. An ND filter or mechanical shutter that reduces the impact of diffraction due to a stop can be used as the light-amount adjusting device.

9. The variable-power optical system described in any one of Items 1 through 8, further comprising: a fourth lens group with a positive optical power arranged on the image side of the third lens group.

If a fourth lens group is provided, an incident angle of an off-axis light onto the image plane (light receiving surface of the image pickup element) can be put closer to a telecentric condition.

10. The variable-power optical system described in Item 9, wherein the fourth lens group is statically positioned when the power varies from the wide-angle end to the telephoto end and satisfies the following conditional expression (11).

$$1.0 < |EPw/fw| < 8.0 \quad (11)$$

In the expression, EPw is a distance from an exit pupil position of a principal ray of a maximum angle of view to the image plane, at the wide-angle end.

If the fourth lens group is statically positioned when the power varies, the mechanical device (lens tube mechanism) for varying the power can be simplified. Further, the position accuracy can also be improved. If the conditional expression (11) is satisfied, the optical characteristics can be enhanced in the optical system wherein the fourth lens group is positioned to be fixed at the time of varying the power. If the upper limit of the conditional expression (11) is exceeded, the optical power of the first lens group will be increased when compact optical overall length is to be maintained. Thus, there will be a remarkable increase in the sensitivity to errors. In the meantime, if the lower limit of the conditional expression (11) cannot be reached, an incident angle of light to the image plane will be less telecentricity. Even if a lens array corresponding to pixels is arranged before an image-pickup plane of an image pickup element, it will be difficult to prevent the peripheral illuminance from being reduced.

11. The variable-power optical system described in any one of Items 1 through 10, wherein the variable-power optical system consists of four lens groups.

When the variable-power optical system is to be designed in an extremely compact configuration, lenses necessarily occupy a certain space due to manufacturing limitations, and there will be a relative increase in the space occupancy rate of lenses with respect to the overall space of the lens unit. This makes it necessary to minimize the number of the lens groups and the number of lenses by giving higher priority to the improvement of the accuracy of the lens as a single product at the sacrifice of manufacturing ease. Adoption of a four-component variable-power optical system configuration will provide a structure that is helpful for designing an extremely compact configuration. Use of the negative-positive-negative-positive four-component variable-power optical system, in particular, optimizes the balance between compact configuration and high performances, i.e., balance between compact configuration and focusing performance, sensitivity to the manufacturing error or telecentricity of the incident angle to the image plane, as compared to other zoom types.

12. The variable-power optical system described in any one of Items 1 through 11, wherein only two lens groups including a lens group for varying the power and a lens group for correcting a shift of the image plane due to zooming, are movable when the power varies.

If the movable lens group includes a lens group for varying the power, the image plane shift resulting from zooming cannot be corrected, depending on the type of the configuration, with the result that discontinuous varying the power may occur. However, adoption of the aforementioned structure ensures continuous varying the power to be performed in any configuration. Further, the volume of the drive apparatus of lens groups can be reduced, as compared to the case wherein there are three or more movable lens groups. This provides a more compact configuration of the variable-power optical unit.

13. The variable-power optical system described in any one of Items 1 through 12, wherein the first lens group consists of a negative lens and a positive lens in order from the object side, and the following conditional expression (12) is satisfied.

$$0.15 < |f1n/f1p| < 0.50 \tag{12}$$

In the expression, f1p is a focal length of the positive lens in the first lens group, and f1n is a focal length of the negative lens in the first lens group.

If the lenses of the first lens group are arranged in the order of negative and positive lenses as viewed from the object, back focus at the wide-angle end can be easily ensured, and satisfactory correction of the astigmatism and chromatic aberration of magnification of the off-axis light of a wider angle of view can be achieved. It should be noted that, if |f1n/f1p| exceeds the upper limit of the conditional expression (12), astigmatism and distortion at the wide-angle end in particular is not sufficiently corrected. In the meantime, if the lower limit of the conditional expression (12) cannot be reached, the power of each lens of the first lens group will be extremely increased, and manufacturing difficulty will increase.

14. The variable-power optical system described in any one of Items 1 through 13, wherein the second lens group consists of a positive lens and a negative lens in order from the object side, and satisfies the following conditional expression (13) is satisfied.

$$1.0 < |f2n/f2p| < 2.5 \tag{13}$$

In the expression, f2p indicates a focal length of the positive lens in the second lens group, and f2n denotes a focal length of the negative lens in the second lens group.

If lenses of the second lens group are arranged in the order of positive and negative lenses as viewed from the object, the principal point position of the second lens group comes closer to the first lens group. Thus, the substantial power of the second lens group can be reduced, with the variable power kept in the working condition. This is helpful for reducing the sensitivity to error. If |f2n/f2p| exceeds the upper limit of the conditional expression (13), spherical aberration is not sufficiently corrected. In the meantime, if the lower limit of the conditional expression (13) cannot be reached, the power of the negative lens of the second lens group will be extremely increased, and the chromatic aberration of magnification will be increased, with the result that image quality will be reduced considerably.

15. The variable-power optical system described in any one of Items 1 through 14, wherein the variable-power optical system includes at least one lens made of a resin material.

Use of a lens made of a resin material in this structure provides high-volume production, and it achieves substantial cost reduction.

16. The variable-power optical system described in Item 15, wherein the lens made of a resin material is a lens formed with a material in which particles with a maximum size of 30 nm or less are dispersed into a resin material.

Generally, when fine particles are mixed with a transparent resin material, light scattering will occur and the transmittance factor will be reduced. Thus, this is hardly used as an optical material. However, if the size of the fine particles is reduced below the wavelength of the transmitting light flux, scattering can be virtually blocked. The refractive index of a resin material is reduced with rise of temperature. However, the refractive index of inorganic particles, for example, rises with the rise of temperature. Thus, the temperature dependency can be utilized in such a way that mutual offset will be caused to ensure that there is almost no change in refractive index. To put it more specifically, dispersion of particles having a maximum size of 30 nm or less into the resin material as the base material will produce the resin material characterized by extremely low temperature dependency of refractive index. For example, dispersion of niobium oxide ($Nb_2O_5$) into acrylic resin can reduce a change in refractive index resulting from temperature change. Thus, at least one lens in the variable-power optical system relating to the present invention is made of the resin material in which such particles are dispersed. This structure minimizes shift of back focus resulting from the environmental temperature change of all the systems in the variable-power optical system relating to the present invention.

17. The variable-power optical system described in Item 9, wherein a positive lens in the fourth lens group or in a lens group arranged closer to the image side than the fourth lens group, is made of a resin material.

This structure including a positive lens made of resin material ensures a cost reduction without sacrificing the compact configuration. If this positive lens is subjected to temperature change, the back focus will be adversely affected. This adverse effect can be drastically reduced by using a material in which particles with a maximum size of 30 nm or less are dispersed.

18. An image-pickup device comprising the variable-power optical system described in any one of Items 1 through 17, and an image pickup element converting an optical image to electric signal, wherein the variable-power optical system is capable of forming an optical image of an object onto a light receiving surface of the image pickup element.

This structure provides a high-precision, variable-power image pickup device of extremely compact configuration that can be mounted on a mobile phone or a mobile information terminal.

19. A digital apparatus comprising the image pickup device described in Item 18, a controller for capturing at least one of a still image and a moving image, wherein a variable-power optical system in the image pickup device is mounted with being capable of forming an optical image of an object onto a light receiving surface of the image pickup element.

20. The digital apparatus described in Item 19, wherein this digital apparatus is a mobile terminal.

The aforementioned structures provide a digital apparatus provided with an image pickup device capable of varying the power with keeping high-precision performances. It should be noted that the aforementioned mobile terminal refers to the digital apparatus normally carried by the user, as typically represented by a mobile phone or a mobile information terminal.

Advantageous Effects of Invention

The present invention provides a variable-power optical system of sufficiently compact configuration exhibiting effective correction of aberrations over the overall variable-power range. It provides, in particular, a variable-power optical system having a variable-power ratio of about 2 to 4 times, and an image pickup device or digital apparatus carrying the same at reduced costs with sufficiently miniaturized configuration.

BRIEF DESCRIPTION OF DRAWINGS

Each of FIGS. 2a and 2b is a schematic diagram representing the external view of a camera-equipped mobile phone carrying the variable-power optical system relating to the present invention; wherein.

Each of FIGS. 16a, 16b, and 16c is a schematic diagram representing the moving direction of the lens groups in the Examples.

Figure 1:
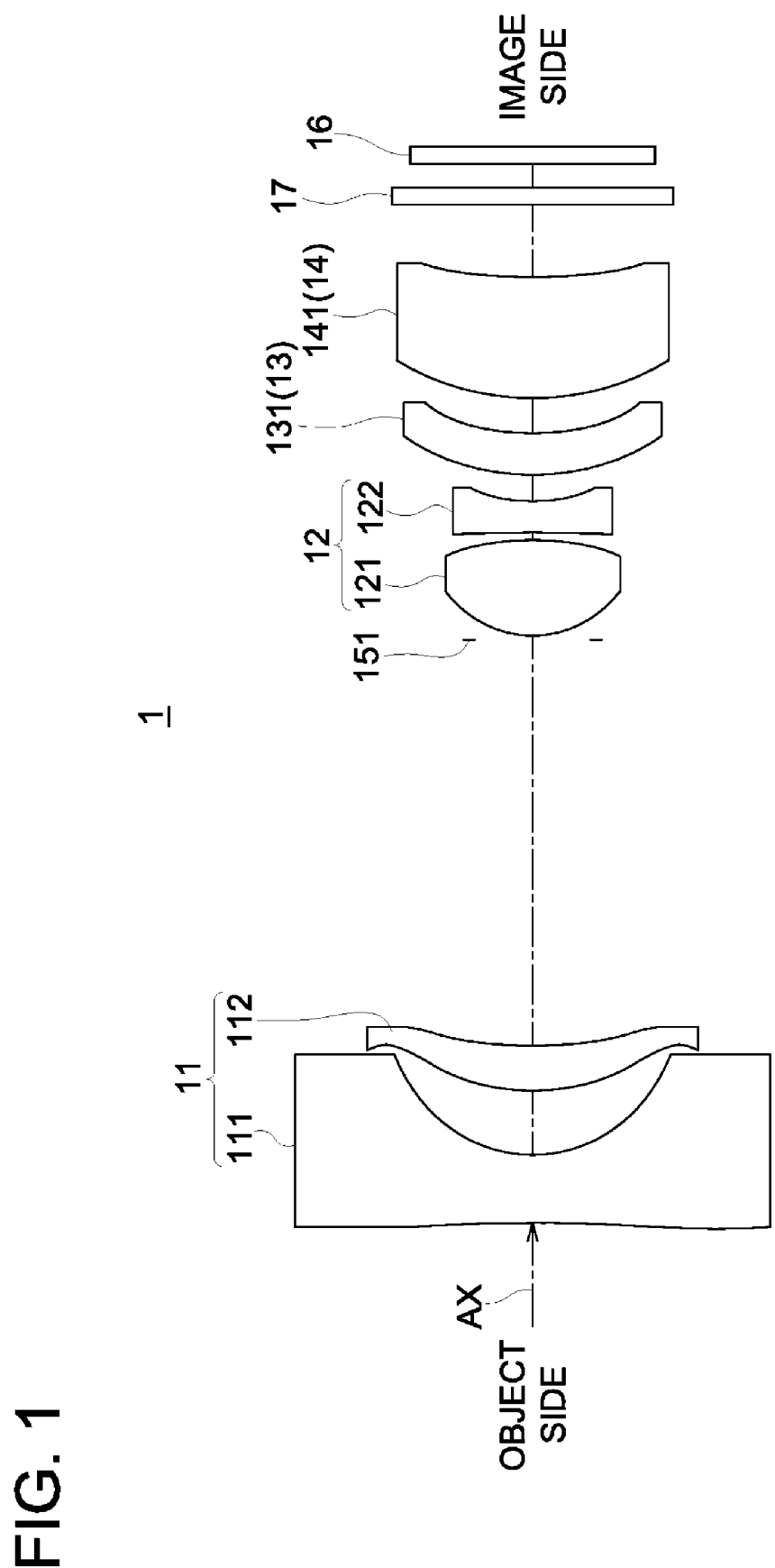
FIG. 1 is a diagram schematically representing the structure of a variable-power optical system relating to the present invention.

REFERENCE SIGNS LIST 1, 1A through 1F Variable-power optical system
11, Gr1 First lens group
12, Gr2 Second lens group
13, Gr3 Third lens group
14, Gr4 Fourth lens group
15, ST Optical stop
16, SR Image pickup element
AX Optical axis
2 Mobile phone (digital apparatus)
27 Image pickup device

BEST MODE FOR CARRYING OUT THE INVENTION

Referring to drawings, the following describes the embodiments of the present invention:

<Description of Variable-Power Optical System Structure>

FIG. 1 is an optical path diagram (an optical path diagram at the wide-angle end) representing the structure of a variable-power optical system 1 relating to the present invention. The variable-power optical system 1 forms an optical image of a subject on the light receiving surface (image plane) of an image pickup element 16 which converts an optical image into an electric signal, and includes a first lens group 11 with negative optical power, a second lens group 12 with positive optical power, a third lens group 13 with negative optical power, and a fourth lens group 14 with positive optical power in that order as viewed from the object. In the variable-power optical system, the space between the first lens group 11 and second lens group 12 decreases when the power varies from the wide-angle end to the telephoto end. The variable-power optical system 1 illustrated in FIG. 1 has the same structure as the variable-power optical system 1A (FIG. 4) of Example 1 to be described later.

In this case, the first lens group 11 is composed of a biconcave negative lens 111 and a positive meniscus lens 112 with a convex surface facing the object side. The second lens group 12 is composed of a biconvex positive lens 121 and a biconcave negative lens 122. The third lens group 13 is composed of a negative meniscus lens 131 alone with a convex surface facing the object side. The fourth lens group 14 is composed of a positive meniscus lens 141 alone with a convex surface facing the object side. An optical stop 15 is provided on the object side of the second lens group 12. An image pickup element 16 is arranged on the image side of the aforementioned variable-power optical system 1 through a low-pass filter 17. This arrangement allows an optical image of the subject on the object side to be led onto the light receiving surface of the image pickup element 16 along the optical axis AX at an appropriate variable-power ratio by the variable-power optical system 1. Then the optical image of the subject is captured by the image pickup element 16.

This variable-power optical system 1 is a four-component variable-power optical system with negative-positive-negative-positive components, which is a negative-lead optical system wherein the first lens group 11 located closest to the object has negative optical power. Thus, the negative optical power of the first lens group 11 can quickly reduce the light entering thereto at a greater angle from the object side in terms of angle. This arrangement is advantageous for reducing the overall optical length and reducing the front lens diameter. Further, in the negative-lead configuration, an increase in the sensitivity to error can be suppressed even when a more compact configuration of the optical system is intended.

In the present invention, as illustrated with reference to the variable-power optical system 1, the first lens group 11 includes at least one negative lens (negative lens 111) and at least one positive lens (positive meniscus lens 112). This arrangement ensures effective correction of the chromatic aberration of magnification. In this case, an example is shown wherein one negative lens and one positive lens are included in the first lens group 11. However, a plurality of negative lenses and positive lenses can be contained in the first lens group. A prism that bends the optical axis AX at right angles, for example, can be included in the first lens group. In this case, however, the first lens group 11 is preferably made of four or less lenses including the prism. This arrangement achieves a cost reduction by reducing the number of lenses. Instead of the biconcave negative lens 111, a negative meniscus lens with a convex surface facing the object side can be used as a preferable embodiment, too.

The second lens group 12 is composed of one positive lens (biconvex positive lens 121) and one negative lens (biconcave negative lens 122). This arrangement provides one positive lens and one negative lens as the minimum requirements for correction of longitudinal chromatic aberration and chromatic aberration of magnification. Further, this arrangement reduces the load on the drive apparatus of the second lens group 12 whose traveling distance is increased when the power varies.

The second lens group 12 includes at least one aspheric surface. In the example of FIG. 1, out of the four lens surfaces owned by the biconvex positive lens 121 and biconcave negative lens 122, at least one surface is formed as an aspheric surface. It goes without saying that a plurality of surfaces can be aspheric surfaces and all of the surfaces can be aspheric surfaces. The presence of an aspheric surface ensures an effective correction of the spherical aberration that is increased with an increase of the optical power of the second lens group 12. Among others, the positive lens in the second lens group 12, i.e., the biconvex positive lens 121 is preferably provided with an aspheric surface. This arrangement ensures an effective correction of the spherical aberration and comatic aberration caused by the increase in the power of the second lens group resulting from compact configuration.

In addition to the second lens group 12, other lens groups are preferably provided with an aspheric surface. Particularly, all the lens surfaces in contact with air are preferably aspherical. To put it another way, the surfaces of all of the negative lens 111, positive meniscus lens 112, biconvex positive lens 121, biconcave negative lens 122, negative meniscus lens 131 and positive meniscus lens 141 on the object side and image side are preferably aspherical. This ensures compatibility between extremely compact configuration and high image quality.

In the variable-power optical system 1, the following conditional expressions (1) through (4) are satisfied under the assumption that:

TLw and TLt denote the distances on the optical axis AX from the tip of the lens surface arranged at the closest position to the object to the image plane, at the wide-angle end (w) and telephoto end (t), respectively, when the object distance is placed at infinite distance; $\Delta N2$ indicates the difference in refractive indexes of the biconvex positive lens 121 and biconcave negative lens 122 as the lenses in the second lens group 12; $\Delta v2$ represents the difference in Abbe numbers of the aforementioned lenses; Lb indicates the distance (length in terms of air) on the optical axis AX from the tip of the positive meniscus lens 141 as the lens arranged at the closest position to the image side, to the image plane, at the telephoto end; and fw denotes the composite focal length of the overall optical system of the variable-power optical system at the wide-angle end.

$$TLw/TLt < 1.2 \tag{1}$$

$$\Delta N2 > 0.15 \tag{2}$$

$$\Delta v2 > 20 \tag{3}$$

$$Lb/fw \leq 1.2 \tag{4}$$

If the TLw/TLt exceeds the upper limit of the conditional expression (1), the effective optical path diameter of the negative lens 111 is required to increase in order to ensure the illuminance at the peripheral of the image plane at the wide-angle end. This makes it difficult to reduce the size of the variable-power optical system 1 in the direction of the outer diameter. If the $\Delta N2$ is below the lower limit of the conditional expression (2), a serious astigmatism will result from an increase in the Petzval's sum. If the $\Delta v2$ is below the lower limit of the conditional expression (3), correction of longitudinal chromatic aberration will be insufficient. If the Lb/fw exceeds the upper limit of the conditional expression (4), it will be difficult to ensure satisfactory correction of both astigmatism at the wide-angle end and astigmatism at the telephoto end.

The relationship of the aforementioned conditional expression (2), i.e., $\Delta N2$ as the difference in refractive indexes of the biconvex positive lens 121 and biconcave negative lens 122 preferably satisfies the following conditional expression (2)'.

$$\Delta N2 > 0.20 \tag{2)'}$$

If the conditional expression (2)' is satisfied, sufficient correction of astigmatism in the second lens group 12 is achieved, thereby reducing the increasing trend of the variations in performance resulting from assembling errors in the lens group.

The relationship of the aforementioned conditional expression (3), i.e., $\Delta v2$ representing the difference in Abbe numbers of the biconvex positive lens 121 and biconcave negative lens 122 preferably satisfies the following conditional expression (3)'.

$$\Delta v2 > 30 \tag{3}'$$

If the conditional expression (3)' is satisfied, the on-axis contrast at the telephoto end is not reduced, as compared to the diffraction limit. Thus, along with the F value at the telephoto end, the degree of difficulty in obtaining a sharp image does not rise.

Further, the relationship of the Lb/fw in the aforementioned conditional expression (4) preferably satisfies the following conditional expression (4)'.

$$Lb/fw \leq 1.0 \tag{4}'$$

If the conditional expression (4)' is satisfied, there will be no increase in the degree of collapse in telecentricity of off-axis light entering onto a light receiving surface of the image pickup element 16 at the telephoto end, whereby the reduction in illuminance at the periphery can be suppressed.

In the variable-power optical system 1, the composite focal length of the second lens group 12 is assumed as "f2", the second lens group 12 preferably satisfies the following conditional expression (5).

$$0.6 < f2/fw < 2.0 \tag{5}$$

If the f2/fw exceeds the upper limit of the conditional expression (5), the optical power of the second lens group 12 will be insufficient, and it will be difficult to obtain a variable-power ratio of about 2 to 4 times while maintaining the compact configuration. If the lower limit of the conditional expression (5) cannot be reached, the sensitivity to the decentration error of the second lens group 12 will be extremely high, and the level of manufacturing difficulty will rise.

The relationship of the f2/fw in the aforementioned conditional expression (5) preferably satisfies the following conditional expression (5)'.

$$0.8 < f2/fw < 1.8 \tag{5}'$$

If the conditional expression (5)' is satisfied, optical power of the second lens group 12 is not reduced, and the overall optical length can be reduced without any increase in the traveling distance of the second lens group 12 required when the power varies. Further, there will be no excessive increase in sensitivity to a decentration error of the second lens group 12, and there is no need to adjust a space between lenses, with the result that production costs can be reduced.

As for a focusing configuration of the variable-power optical system 1, it is preferable that focusing from an object at the infinity distance to an object at a near distance is performed by moving the third lens group 13 (negative meniscus lens 131) toward the image side. In this case, if the composite focal length of the third lens group 13 is assumed as "f3", the following conditional expression (6) is preferably satisfied.

$$1.5 < |f3/fw| < 6.0 \tag{6}$$

Focusing can be performed by moving the first lens group 11 for example. However, when the third lens group 13 is used for focusing, it is possible to capture a sharp image of an object at a near distance, without allowing an increase in the overall optical length or front lens diameter to be caused by movement of lenses. When the conditional expression (6) is satisfied, the optical performance of the third lens group 13 and the degree of manufacturing ease will be improved. If the f3/fw exceeds the upper limit of the conditional expression (6), there will be an increase in the traveling distance of the third lens group 13. Thus, when an attempt is made to maintain a compact configuration, restriction will be imposed on the movement of the lens for varying the power, and a variable-power ratio is hardly obtained. In the meantime, if the f3/fw is below the lower limit of the conditional expression (6), the optical power of the third lens group 13 will be excessive and sensitivity to a decentration error will be excessively high. Thus, it makes assembling lens difficult.

In the variable-power optical system 1, a lens group to be moved for varying the power can be selected as appropriate. In this case, assume that the third lens group 13 moves to form a locus in a convex shape projecting to the object when the power varies from the wide-angle end to the telephoto end. Also assume that "D3" is the displacement amount of the third lens group 13 when the power varies from the wide-angle end to the telephoto end, and "ft" is the composite focal length of the overall optical system at the telephoto end. Based on this assumption, the conditional expression (7) is preferably satisfied.

$$|D3/(fw \times ft)^{1/2}| < 1.5 \tag{7}$$

The third lens group 13 moves to form a convex shape projecting the object when the power varies from the wide-angle end to the telephoto end. This procedure reduces the load for varying the power of the third lens group 13. When the conditional expression (7) is satisfied, sensitivity to a decentration error of the third lens group 13 can be suppressed. If the upper limit of the conditional expression (7) is exceeded, there will be an excessive increase in sensitivity to a decentration error of the third lens group 13, with the result that a degree of manufacturing difficulty will increase.

The relationship of the aforementioned conditional expression (7) preferably satisfies the following conditional expression (7)'.

$$D3/(fw \times ft)^{1/2} < 1.0 \tag{7}'$$

If the conditional expression (7)' is satisfied, variations in the off-axis performance due to the rise in sensitivity to a decentration error will not increase. This eliminates need of adjusting the variations, hence reduces the production cost.

By contrast, the first lens group 11 is preferably positioned statically when the power varies from the wide-angle end to the telephoto end. Fixing of the first lens group 11 provides a substantial reduction in the load of the lens group drive apparatus. If the first lens group 11 is made movable at the time of varying the power, the drive apparatus has to be installed outside the first lens group 11 and this causes an increase in the size in the direction of the outer diameter. Thus, fixing of the first lens group 11 is very helpful for reducing the size in the direction of the outer diameter.

When the first lens group 11 is statically positioned, assure that "h1" is the effective optical path radius of the lens surface closest to the object, i.e., the surface of the negative lens 111 facing the object side at the wide-angle end. In this case, the conditional expression (8) is preferably satisfied.

$$0.1 < h1/TLw \tag{8}$$

If h1/TLw is below the lower limit of the conditional expression (8), the optical power of the first lens group 11 will be excessive and sensitivity to a decentration error will increase. This requires adjustment work at the time of assembling, and will raise the production cost.

The configuration of the first lens group 11 and lens space between the first lens group 11 and second lens group 12 preferably conform to the following: Assume that T1 is a thickness on the optical axis AX from the foremost surface of the lens in the first lens group 11 (the object side surface of the negative lens 111) to the rearmost surface of the first lens group 11 (image side surface of the positive meniscus lens 112), and T2 is a distance on the optical axis between the first lens group 11 and second lens group 12 (a space at the telephoto end between the image side surface of the positive meniscus lens 112 and the object side surface of the biconvex positive lens 121) at the telephoto end. Under this assumption, the conditional expressions (9) and (10) are preferably satisfied.

$$0.2 < T1/(fw \times ft)^{1/2} < 1.5 \quad (9)$$

$$T12/(fw \times ft)^{1/2} < 0.3 \quad (10)$$

If the upper limit of the conditional expression (9) is exceeded, a substantial traveling distance of the second lens group 12 for varying the power will be reduced, when an attempt is made to maintain compact overall optical length. Then the optical power of the second lens group 12 will be excessive and the degree of manufacturing difficulty will increase. If the lower limit of the conditional expression (9) cannot be reached, the optical power of the negative lens 111 in the first lens group 11 will be reduced. The principal point on the rear will move away from the image plane. If an attempt is made to maintain the same focal length, there will be relative difficulty in ensuring the back focus. Further, it will be very difficult to move the exit pupil away from the image plane. If the upper limit of the conditional expression (10) is exceeded, a substantial traveling distance of the second lens group 12 for varying the power will be reduced, when an attempt is made to maintain the compact overall optical length. This requires the optical power of the second lens group 12 to be increased, with the result that the degree of manufacturing difficulty increases.

The movable lens groups for varying the power are preferably restricted to two lens groups, i.e., a lens group for varying power and a lens group for correcting a shift of the image plane due to zooming. The variable-power optical system 1 of FIG. 1 is preferably configured in such a way that only the second lens group 12 and third lens group 13, for example, are moved when the power varies. If the number of the movable groups is one, image plane shift resulting from zooming is not corrected, depending on the type of configuration. This may result in discontinuous varying power. However, use of the aforementioned structure permits continuous varying power to be achieved, independently of any configuration. Further, the percentage of the volume of the lens group drive apparatus with reference to the overall volume can be reduced, as compared with the case of three or more movable lens groups. This ensures compact configuration of the variable-power optical system 1.

In the present invention, there is no particular restriction to the position of the optical stop (aperture stop) 15. As shown in FIG. 1, the optical stop 15 is preferably provided on the object side of the second lens group 12. The aperture diameter of the optical stop 15 is preferably fixed.

The arrangement of the optical stop 15 on the object side of the second lens group allows the front lens diameter of the first lens group 11 to be minimized. In the meantime, the space between the first lens group 11 and second lens group 12 has a greater impact on the overall optical length. If an attempt is made to increase this space in order to insert a variable diaphragm mechanism in position, there will be a need to extend the overall optical length by about two or three times. To solve this problem, the aperture diameter is fixed so that an aperture member is simplified. This arrangement eliminates the need of excessively increasing the space between the first lens group 11 and second lens group 12, and permits the thickness to be reduced in the direction of the optical axis.

A light-amount adjusting device is preferably arranged on the image side of the second lens group 12, although this is not illustrated in FIG. 1. For example, an ND filter or mechanical shutter to avoid the adverse effects of diffraction due to the stop can be used as the light amount-adjusting device. Generally, to avoid irregularity in the light amount between the center of the image plane and the periphery thereof, the light-amount adjusting device is preferably installed at such an stop position that all the light fluxes pass through one and the same position. In the example of FIG. 1, the light-amount adjusting device is preferably installed on the object side of the second lens group 12. However, the space between the first lens group 11 and second lens group 12 has a great impact on the overall optical length. If this space is increased, the overall optical length may be extended by about two or three times. This makes it difficult to install a thicker light-amount adjusting device at the stop position. To solve this problem, the light-amount adjusting device is mounted on the image side of the second lens group 12 close to the optical stop 15, whereby the irregularity of light amount can be reduced approximately to the same level as that at the stop position, without sacrificing the compact configuration.

The variable-power optical system of the present invention is only required to include three negative-positive-negative components. However, the fourth lens group 14 having positive optical power (positive meniscus lens 141) is preferably arranged on the image side of the third lens group 13, as shown in FIG. 1. Arrangement of the fourth lens group 14 allows an incident angle of an off-axis light entering onto the light receiving surface of the image pickup element 16 to be brought close to a telecentric condition.

When the fourth lens group 14 is arranged, the fourth lens group 14 is preferably arranged statically at the time of varying the power from the wide-angle end to the telephoto end. This procedure simplifies the structure of a mechanical device (lens tube mechanism) for variable power, and enhances positioning accuracy.

Further, assume that "EPw" stands for the distance from the position of the exit pupil of the principal ray of the maximum angle of view to the image plane at the wide-angle end. Then the following conditional expression (11) is preferably satisfied.

$$1.0 < |EPw/fw| < 8.0 \quad (11)$$

If the conditional expression (11) is exceeded, the optical power of the first lens group 11 is increased when an attempt is made to maintain the compact overall optical length. This causes a drastic increase in the sensitivity to errors. In the meantime, if the lower limit of the conditional expression (11) cannot be reached, the telecentricity of the off-axis light entering onto the light receiving surface will be destroyed, and the reduction in peripheral illuminance is hardly avoided, despite arrangement of a lens array corresponding to the pixel being arranged before the light receiving surface of the image pickup element 16.

The relationship of |EPw/fw| in the aforementioned conditional expression (11) preferably satisfies the following conditional expression (11)'.

$$2.0 < |EPw/fw| < 4.0 \quad (11)'$$

If the conditional expression (11)' is satisfied, the difference in the incident angles of off-axis light onto the light receiving surface of the image pickup element 16 at the wide-angle end and telephoto end is protected against becoming excessively small, and the reduction in peripheral illuminance is suppressed at the time of varying the power.

FIG. 1 shows the four-component variable-power optical system with negative-positive-negative-positive components. Another lens group can also be added thereto. However, the variable-power optical system 1 consisting of four lens groups alone is advantageous for designing an extremely compact configuration. Particularly, when the structure of four negative-positive-negative-positive components is provided, it is possible to optimize the balance between the compact configuration and high performance, i.e., balance between compact configuration and focusing performance, sensitivity to the manufacturing error or telecentricity of the incident angle to the image plane, as compared to other zoom types.

Among other things, the variable-power optical system preferably includes a first lens group composed of a negative lens and a positive meniscus lens with a convex surface facing the object side; a second lens composed of a biconvex lens and negative lens; a third lens group composed of a negative lens; and a fourth lens group composed of a positive lens in that order as viewed from the object. Use of the positive and negative order for the second lens group is intended to place the principal point position of the second lens group closer to the first lens group, thereby reducing the substantial power of the second lens group with the varying-power performance kept unchanged, and hence reducing the sensitivity to errors. Arrangement of the biconvex lens in the second lens group is intended to increase the power of the second lens group and to reduce the traveling distance at the time of varying the power. Use of a negative lens for the third lens group is designed to ensure compatibility between reduction in the overall optical length and correction of astigmatism. Use of a positive lens for the fourth lens group is designed to allow an incident angle of off-axis light onto the light receiving surface of the image pickup element to be brought close to a telecentric condition, as described above. Such requirements are met in the variable-power optical system 1 shown in FIG. 1. Thus, the variable-power optical system 1 has a preferable configuration in the sense in which it is shown here.

As shown in FIG. 1, the first lens group 11 is composed of one negative lens (negative lens 111) and one positive lens (positive meniscus lens 112) in that order as viewed from the object. Not only that, when "f1p" is the focal length of the positive meniscus lens 112, and "f1n" is the focal length of the negative lens 111, the following conditional expression (12) is preferably satisfied.

$$0.15<|f1n/f1p|<0.50 \quad (12)$$

If the lenses of the first lens group 11 are arranged in the order of negative and positive as viewed from the object, back focusing can be easily ensured at the wide-angle end, and satisfactory correction of astigmatism and chromatic aberration of magnification of off-axis light of a wider angle of view can be achieved. It should be noted that, if |f1n/f1p| exceeds the upper limit of the conditional expression (12), astigmatism and distortion at the wide-angle end in particular is not corrected sufficiently. In the meantime, if the lower limit of the conditional expression (12) cannot be reached, the power of each of the negative lens 111 and positive meniscus lens 112 constituting the first lens group will be extremely increased, and manufacturing difficulty will increase.

The second lens group 12 is composed of one positive lens (biconvex positive lens 121) and one negative lens (biconcave negative lens 122). When "f2p" is the focal length of the biconvex positive lens 121 and "f2n" is the focal length of the biconcave negative lens 122, the following conditional expression (13) is preferably satisfied.

$$1.0<|f2n/f2p|<2.5 \quad (13)$$

If the conditional expression (13) is exceeded, spherical aberration is hardly corrected sufficiently. In the meantime, if the lower limit of the conditional expression (13) cannot be reached, the power of the biconcave negative lens 122 will be excessive and chromatic aberration of magnification will increase, with the result that the image quality will be seriously deteriorated.

Further, the second lens group 12 preferably satisfies the following conditional expression (14).

$$0.3<f2/ft<0.9 \quad (14)$$

If the upper limit of the conditional expression (14) is exceeded, the power of the second lens group 12 will be insufficient and the variable-power ratio of about 2 to 4 times is hardly obtained. In the meantime, if the lower limit of the conditional expression (14) cannot be reached, the sensitivity to errors of the second lens group 12 will be excessively high, and the degree of manufacturing difficulty will increase.

The relationship of the f2/ft in the aforementioned conditional expression (14) preferably satisfies the following conditional expression (14)'.

$$0.4<f2/ft<0.8 \quad (14)'$$

If the conditional expression (14)' is satisfied, the optical power of the second lens group 12 is not reduced, and the overall optical length can be reduced without any increase in the traveling distance of the second lens group 12 required at the time of varying the power. Further, there will be no excessive increase in the sensitivity to the decentration error of the second lens group 12, and there is no need to adjust the space between lenses, with the result that production costs can be reduced.

The following describes materials constituting the variable-power optical system 1. There is no particular restriction to materials of lenses constituting the first through fourth lens groups 11 through 14. Optical materials made of various forms of glasses and resins (plastics) can be utilized. When a resin material is used, it is characterized by light weight and can be used in high-volume production by injection molding. Thus, the production cost can be reduced and the weight of the variable-power optical system 1 can be reduced. In this sense, resin is superior to glass. Thus, the variable-power optical system 1 is preferably provided with at least one lens made of resin material. It goes without saying that two or more lenses made of resin material can be used.

When two or more lenses made of resin material are used, a negative lens (negative meniscus lens 131 in the case of FIG. 1) of the third lens group 13 and a positive lens (positive meniscus lens 141) of the fourth lens group 14 are preferably made of resin. This arrangement can reduce the shift of back focusing resulting from environmental temperature change.

This lens made of resin is preferably made of the material obtained by dispersing particles with a maximum size of 30 nm or less—the inorganic particles in particular—in a resin material. Use of such a lens minimizes a change in refractive index resulting from temperature change in the lens made of resin material.

The following describes the details of the refractive index change due to temperature. The refractive index change A due to the temperature can be represented by the following expression (8) by dividing the refractive index n by temperature t, based on the Lorentz-Lorenz equation.

[Mathematical Formula 1]

$$A = \frac{(n^2+2)(n^2-1)}{6n}\left\{(-3\alpha) + \frac{1\partial[R]}{[R]\partial t}\right\} \quad (15)$$

wherein α indicates a linear expansion coefficient, and [R] denotes molecular refraction.

For the resin material, the contribution of the second term is generally smaller than that of the first term of the conditional expression (15), and can be almost ignored. For example, the linear expansion coefficient α of the PMMA resin is $7 \times 10^{-5}$. When this is substituted into the aforementioned expression, $A = -1.2 \times 10^{-4}$ [/° C.]. Approximate agreement with the actual measurement can be found. To put it more specifically, the temperature change A of the refractive index of about $-1.2 \times 10^{-4}$ [/° C.] in the conventional art is preferably kept below $8 \times 10^{-5}$ [/° C.] in terms of absolute value, more preferably below $6 \times 10^{-5}$ [/° C.] in terms of absolute value. If the change A due to the temperature is kept below $6 \times 10^{-5}$ [/° C.], the fluctuation of back focusing at the time of environmental temperature change can be reduced to about half. Table 1 shows the refractive index change A (=dn/dT) due the temperature of the resin material applicable to the variable-power optical system 1.

TABLE 1

| Plastic material | A (approximate value) [$10^{-5}$/° C.] |
|---|---|
| Polyolefin | −11 |
| Polycarbonate | −14 |

In the case of the fourth lens group 14, or in the case wherein a lens group is located on the image side of the fourth lens group 14, a positive lens of this lens group is preferably made of resin. This arrangement permits a cost to be reduced without sacrificing the compact configuration. Further, the positive lens has an adverse effect on the back focusing at the time of temperature change. A substantial reduction of this adverse effect can be achieved by dispersing the inorganic particles in particular having a diameter of 30 nm or less in the material.

When an aspheric glass lens is used in the variable-power optical system 1, the aspheric glass lens can be made by a molding operation. Alternatively, the aspheric glass lens can be formed with glass and resin as a complex type. Molded products can be manufactured in a high-volume production method, but there are restrictions on the type of lens materials. For the complex products, there are various glass materials that serve as substrates, and it provides high degree of freedom in terms of its design, which is advantageous. Generally, an aspheric lens made of a material with high refractive index cannot be easily produced by molding. For a lens with a single aspheric surface, the advantages of the complex type can be utilized to the maximum.

The variable-power optical system 1 can be provided with a mechanical shutter capable of cutting off light to the image pickup element 16, instead of the optical stop 15. Such a mechanical shutter is effective in preventing smear, when a CCD (Charge Coupled Device) or the like is employed, as the image pickup element 16.

The conventionally known cam mechanism and stepping motor can be used as a drive source for the lens groups, stop and shutter arranged on the variable-power optical system 1. Further, when there is not much traveling distance, or the driven group is less heavy, a piezoelectric actuator designed in an extremely compact configuration can be used. This actuator permits independent operation of each group while minimizing an increase in the volume of the drive section and power consumption. This arrangement provides a further compact configuration of the image pickup lens apparatus including the variable-power optical system 1.

In response to the light amount of the optical image of a subject whose image has been formed by the variable-power optical system 1, the image pickup element 16 provides photoelectric conversion into image signal of each of the red (R), green (G) and blue (B) components, and outputs the result into a predetermined image processing circuit. For example, the image pickup element 16 can use a single chip color area sensor, a so-called Bayer method, wherein CCDs are arranged in a two-dimensional array in an area sensor and color filters of red (R), green (G) and blue (B) are arranged in a checkered pattern on the surface of each CCD. In addition to such a CCD image sensor, a CMOS image sensor or VMIS image sensor can also be used.

The low-pass filter 17 is a parallel-flat optical component arranged on the light receiving surface of the image pickup element 16 to remove noise components. A birefringence type low-pass filter made of crystal or the like wherein a predetermined direction of crystal axis has been adjusted, or a phase type low-pass filter wherein the required optical cutoff frequency characteristics are implemented by diffraction effect is applicable to this low-pass filter 17. It should be noted that the low-pass filter 17 is not always required. Further, instead of the aforementioned optical low-pass filter 17, an infrared ray cut filter can be used to remove the noise included in the image signal of the image pickup element 16. Further, infrared reflection coating can be provided on the surface of the optical low-pass filter 17 so that both filter functions are performed by one arrangement.

<Description of Digital Apparatus Incorporating a Variable-Power Optical System>

Figure 2A:
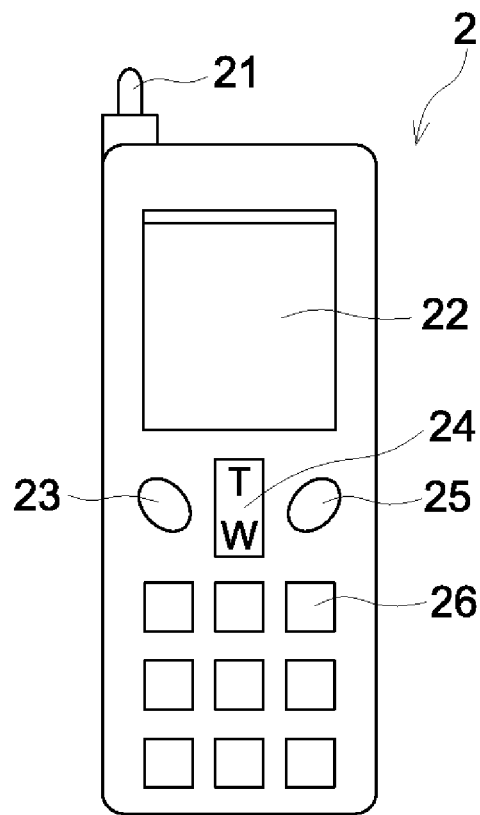
FIG. 2a is a schematic diagram representing the external view of the operation surface thereof.
Figure 2B:
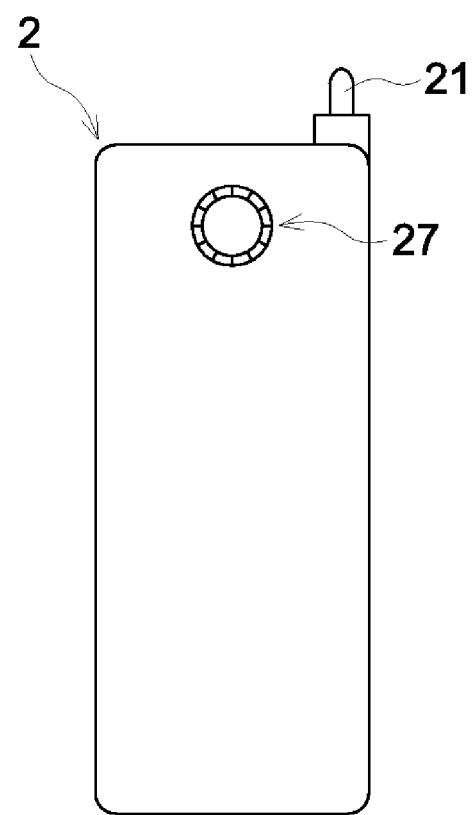
FIG. 2b is a schematic diagram representing the rear of the operation surface thereof.

The following describes a digital apparatus incorporating the aforementioned variable-power optical system 1. Each of FIGS. 2a and 2b is a schematic diagram representing the external view of a camera-equipped mobile phone as an embodiment of the digital apparatus of the present invention. In this invention, the digital apparatus includes a digital still camera, video camera, digital video unit, mobile information terminal (PDA: Personal Digital Assistant), personal computer, mobile computer or the peripheral equipment thereof (mouse, scanner, printer, etc.).

FIG. 2a shows an operation surface of a mobile phone 2, and FIG. 2b shows a back side of the operation surface, i.e., a rear of the mobile phone. An antenna 21 is mounted on the top of the mobile phone 2. The operation side thereof is provided with a rectangle display 22, an image switching button 23 for starting the image pickup mode, and switching between the still image and moving image, and a zooming button 24 for controlling varying-power (zooming) operation, a shutter button 25, and a dial button 26. The zoom button 24 has a letter "T" standing for "telephoto" printed on the top end, and a letter "W" standing for "wide angle" printed on the bottom end, and includes a two-contact switch capable of instructing each varying-power operation when the printed position is depressed.

Figure 3:
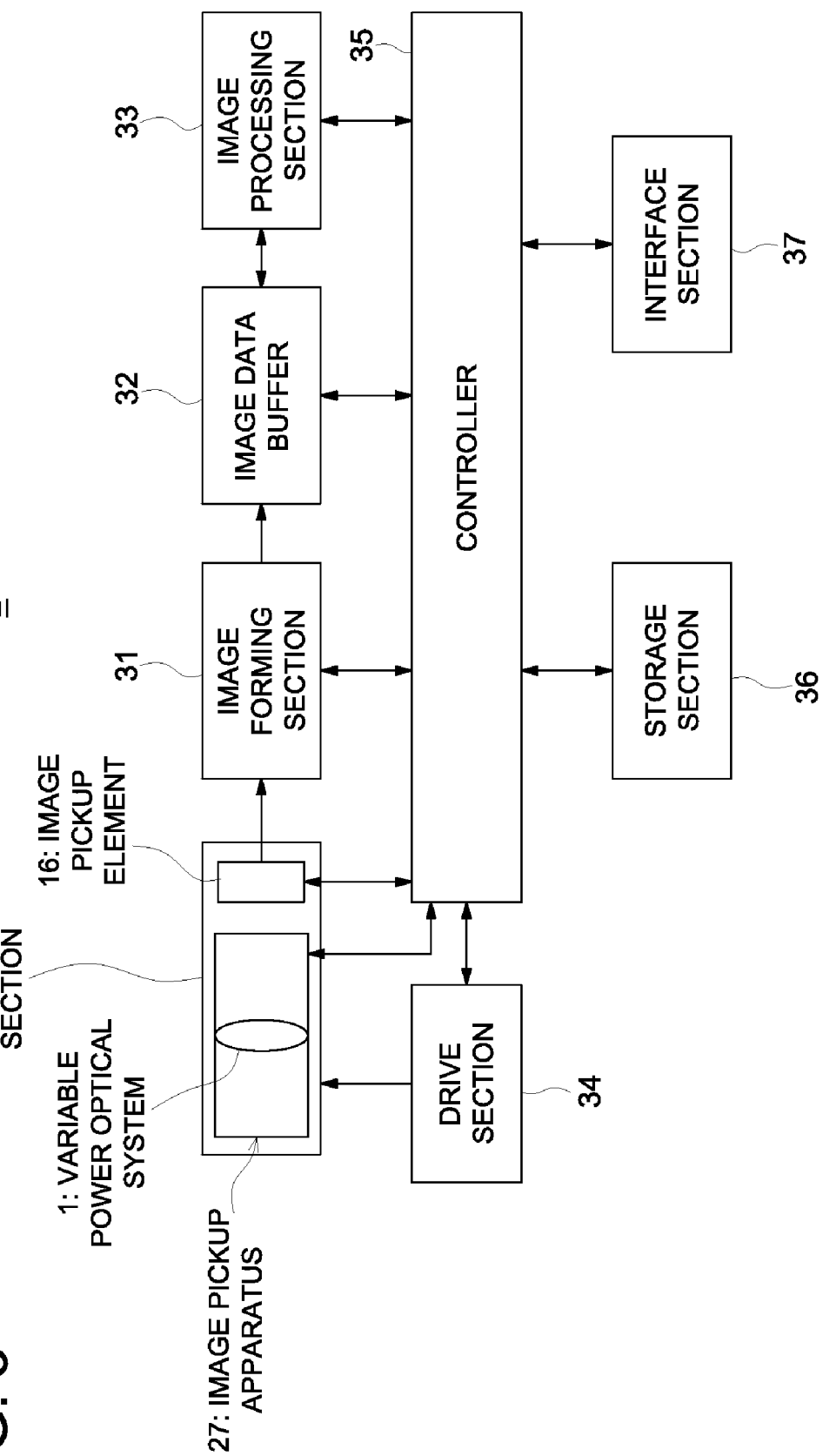
FIG. 3 is a functional block diagram showing the structure of the functional section of image pickup as an example of the digital apparatus equipped with the variable-power optical system relating to the present invention.

FIG. 3 is a functional block diagram showing an electrical functional structure related to image pickup of the mobile phone 2. To provide image-pickup functions, the mobile phone 2 includes an image pickup section 30, image generating section 31, image data buffer 32, image processing section 33, drive section 34, control section 35, storage section 36, and interface section 37.

The image pickup section 30 includes an image pickup apparatus 27 and image pickup element 16. The image pickup apparatus 27 is provided with a variable-power optical system 1 (illustrated in FIG. 1), and a lens drive apparatus (not illustrated) for varying the power and focusing by driving lenses in the direction of optical axis. Light from a subject forms an image on the light receiving surface of the image pickup element 16 by means of the variable-power optical system 1, and the optical image of the subject is generated.

The image pickup element 16 converts an optical image of the subject formed by the variable-power optical system 1, into electric signal (image signals) of each of the color components, R (red), G (green) and B (blue). The signal is outputted to the image generating section 31 as image signal of each of R, G and B colors. The image pickup element 16 controls such image pickup operations as capturing of either still or moving image, or reading the output signal of each image in the image pickup element 16 (horizontal synchronization, vertical synchronization and transfer) under the control of the control section 35.

The image generating section 31 applies processing of amplification and digital processing to the analog output signal from the image pickup element 16, and performs the conventionally known image processing such as determination of the adequate black level for the overall image, gamma correction, white balance adjustment (WB adjustment), contour correction and uneven color adjustment, whereby the image data of each image is generated from the image signal. The image data generated by the image generating section 31 is outputted to the image data buffer 32.

The image data buffer 32 stores the image data on a temporary basis and constitutes a memory used as a work area wherein the processing (to be described later) is applied to this image data by the image processing section 33. It is made up, for example, of a RAM (Random Access Memory).

The image processing section 33 is a circuit that applies such image processing as resolution conversion to the image data of the image data buffer 32. If required, arrangement can be made to ensure that the image processing section 33 corrects aberration that has not been corrected by the variable-power optical system 1.

The drive section 34 drives a plurality of lens groups of the variable-power optical system 1 so that desired varying power and focusing operations are performed by the control signal outputted from the control section 35.

The control section 35 is provided with a micro processor, for example, and controls the operations of the image pickup section 30, image generating section 31, image data buffer 32, image processing section 33, drive section 34, storage section 36 and interface section 37. To put it another way, the control section 35 provides control in such a way that at least one of the still and moving images of a subject will be captured by the image pickup apparatus 27 and image pickup element 16.

The storage section 36 is a storage circuit for storing the image data generated by the still or moving image of the subject, and is provided with a ROM (Read Only Memory) and RAM (Random Access Memory), for example. To be more specific, the storage section 36 performs the function of storing the still or moving image.

The interface section 37 is an interface for exchanging image data with the external equipment. It is an interface conforming to the USB or IEEE 1394 standards, for example.

The following describes an image pickup operation of the mobile phone 2 having the aforementioned configuration. To capture a still image, the image pickup mode is started by pressing the image switching button 23. In this case, a still image pickup mode is started by pressing the image switching button 23 once. If the image switching button 23 is pressed again in this state, the moving image pickup mode is selected. To be more specific, the control section 35 of the mobile phone 2 having received the instruction from the image switching button 23 allows the image pickup apparatus 27 and image pickup element 16 to perform the operation of capturing at least one of the still and moving images of the subject on the object side.

When the still image pickup mode has started, the control section 35 provides control in such a way that the operation of capturing a still image is performed by the image pickup apparatus 27 and image pickup element 16. At the same time, the lens drive apparatus (not illustrated) of the image pickup apparatus 27 is driven to perform the operation of focusing. This procedure allows a well-focused optical image to be formed on the light receiving surface of the image pickup element 16 repeatedly on a predetermined cycle. After having been converted into image signal of each of R, G and B components, the signal is outputted to the image generating section 31. The image signal is stored in the image data buffer 32 on a temporary basis, and image processing is performed by the image processing section 33. After that, the signal is transferred to the display memory (not illustrated) and is led to the display 22. By watching the display 22, the operator is allowed to make adjustments in such a way that the subject will be located within a desired position on the screen. A still image can be obtained by pressing the shutter button 25 in this state. To be more specific, image data is stored in the storage section 36 as a memory of the still image.

In this case, to perform a zooming operation in order to capture an image of a subject located away from the operator or to enlarge the subject near the operator, the "T"-marked portion on the top end of the zooming button 24 is pressed. Then the current condition is detected. In response to the time of pressing the button, the control section 35 provides control to perform the lens drive operation for zooming. Then zooming operation is performed by the variable-power optical system 1 on a continuous basis. When the magnification rate is to be reduced, for example, in the case of excessive zooming, the "W"-marked position on the bottom end of the zooming button 24 is pressed. Then the current condition is detected and the control section 35 controls the variable-power optical system 1, whereby zooming operation is performed on a continuous basis in conformance to the time of pressing. In the manner described above, the magnification rate for a subject located away from the operator can be adjusted using the zooming button 24. Similarly to the case of the normal operation of capturing a life-size image, adjustment is made so that the main subject is placed at a desired position on the screen, and the shutter button 25 is pressed. This procedure provides an enlarged still image.

To capture a moving image, the image switching button 23 is pressed once to start the still image pickup mode. Then the image switching button 23 is pressed again to select the moving image pickup mode. This procedure allows the control section 35 to control the image pickup apparatus 27 and image pickup element 16 to capture a moving image. After that, similar to the case of the operations for capturing a still image, the operator watches the display 22 and makes adjustments to ensure that the image of the subject gained through the image pickup apparatus 27 is located at a desired position on the screen. Here, similar to the case of the operations for capturing a still image, the magnification rate of the subject can be adjusted using the zooming button 24. The shutter button 25 is pressed in this state. This starts the operation of capturing a moving image. The magnification rate of the subject can be changed as desired during image pickup operation by pressing the zoom button 24.

While a moving image is captured, the control section 35 allows the image pickup apparatus 27 and image pickup element 16 to capture the moving image. At the same time, the control section 35 drives the lens drive apparatus (not illustrated) of the image pickup apparatus 27 so that the focusing operation is performed. This procedure allows a well-focused optical image to be formed on the light receiving surface of the image pickup element 16 repeatedly on a predetermined cycle. After having been converted into the image signal of each of R, G and B components, the signal is outputted to the image generating section 31. The image signal is stored in the image data buffer 32 on a temporary basis, and image processing is performed by the image processing section 33. After that, the signal is transferred to the display memory and is led to the display 22. When the shutter button 25 is pressed again, the moving image pickup operation terminates. The moving image having been captured is led to the storage section 36 as a moving image memory, and is stored therein.

<Description of a More Specific Embodiment of the Variable-Power Optical System>

Referring to the drawings, the following describes the variable-power optical system 1 of FIG. 1, i.e., the variable-power optical system 1 constituting the image pickup apparatus 27 mounted on the mobile phone 2 of FIGS. 2a and 2b.

EXAMPLES

Example 1

Figure 4:
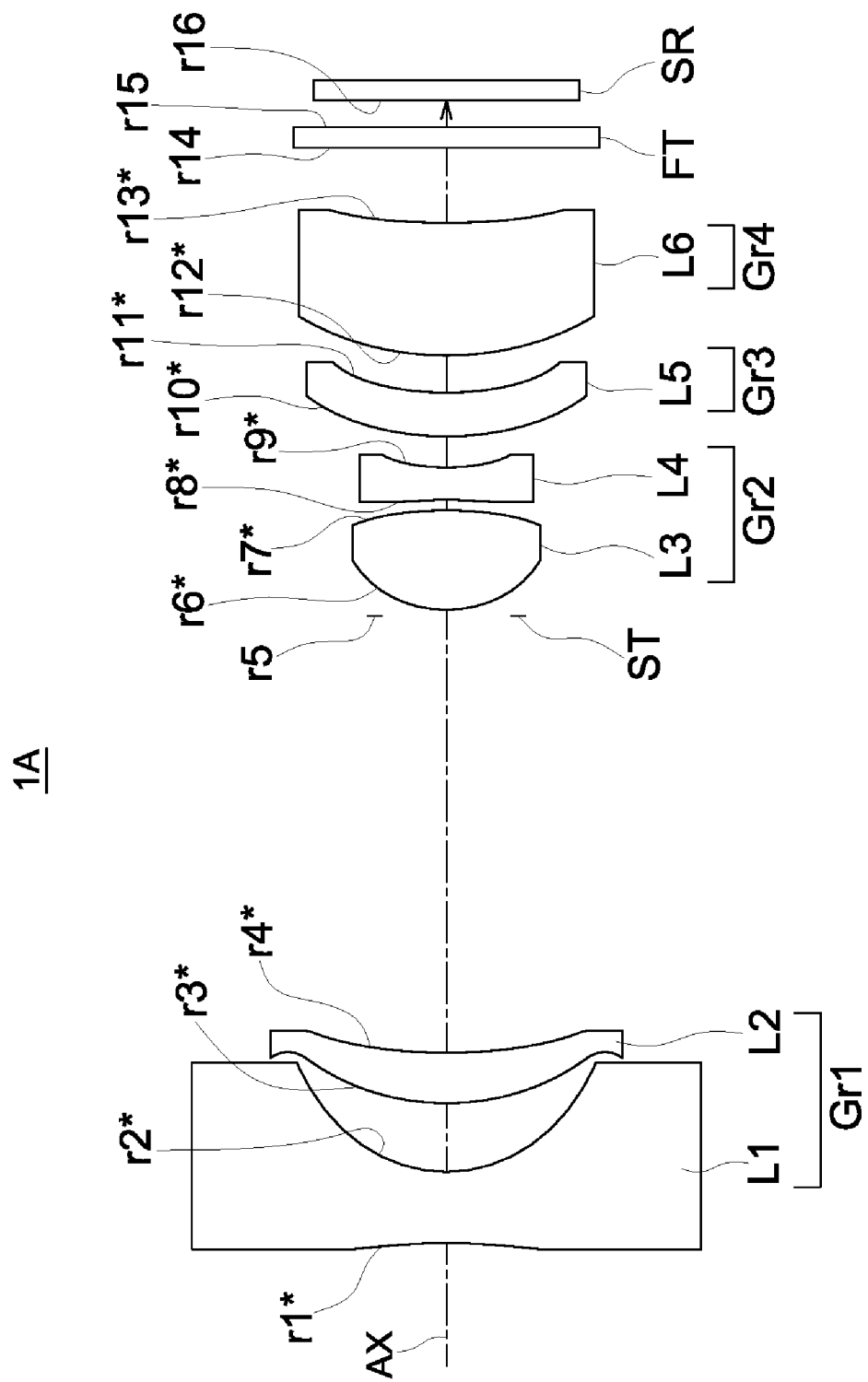
FIG. 4 is a cross sectional view showing the optical path at the wide-angle end of the variable-power optical system relating to Example 1 of the present invention.

FIG. 4 is a cross sectional view (optical path diagram) traversing the optical axis AX, representing an arrangement of lens groups in the variable-power optical system 1 of Example 1. The optical path diagrams of FIG. 4 and FIG. 5 through 9 which are shown later show a lens arrangement at the wide-angle end (W). Throughout Example 1 and Examples 2 through 6 to be described below, these lens groups include a first lens group (Gr1) having a negative optical power as a whole, a second lens group (Gr2) having a positive optical power, and a third lens group (Gr3) having a negative optical power, in that order as viewed from the object side in the drawings (the left side in FIG. 4). Further, these lens groups also include a fourth lens group (Gr4) having a positive optical power except for Example 4. To put it another way, the lens groups are aligned in a negative-lead configuration wherein the first lens (Gr1) closest to the object has a negative optical power.

In the variable-power optical system 1A of Example 1 in FIG. 4, lens groups are configured in the following order as viewed from the object side: The first lens group (Gr1) has a negative optical power as a whole, and is composed of a biconcave negative lens (first lens L1) and a positive meniscus lens (second lens L2) with a convex surface facing the object side. The second lens group (Gr2) has the positive optical power as a whole, and is composed of a biconvex positive lens (third lens L3) and a negative concave lens (fourth lens L4). The object side of this second lens group (Gr2) is provided with an optical stop (ST) that moves together with the second lens group (Gr2) at the time of varying the power. The third lens group (Gr3) is composed of one negative meniscus lens (fifth lens L5) with a convex surface facing the object side having a negative optical power. The fourth lens group (Gr4) is composed of one positive meniscus lens (sixth lens L6) with a convex surface facing the object side having a positive optical power. The light-receiving surface of an image pickup element (SR) is provided on the image side of this fourth lens group (Gr4) through the parallel flat plate (FT). The parallel flat plate (FT) corresponds to an optical low-pass filter, infrared cutoff filter or image pickup element cover glass.

Instead of the aforementioned optical stop (ST), a mechanical shutter can be arranged. FIG. 4 shows a continuous variable-power optical system. However, to achieve a more compact configuration, it is possible to configure a two-focus switching type variable-power optical system using the same optical configuration. Especially, as for the occasion that the traveling locus of the first lens group (Gr1) runs to make a U-turn (moves to form a locus in a convex shape projecting to the image side) when the power varies from the wide-angle end to the telephoto end, resulting in the approximately the same overall optical lengths at the wide-angle end and telephoto end, use of the two-focus switching type variable-power optical system allows the first lens group (Gr1) to be statically arranged at the time of varying the power. This arrangement provides a great advantage in reducing the size of the units including the drive mechanism. These points also apply to Examples 2 through 6 to be discussed below.

The number ri (i=1, 2, 3, . . . ) labeled to the lens surfaces in FIG. 4 indicates i-th lens when counted from the object side (wherein a cemented lens surface is counted as one surface). The surface showing "ri" followed by "*" is an aspheric surface. Each of the aforementioned optical stops (ST), both surfaces of the parallel flat plate (FT) and the light receiving surface of the image pickup element (SR) are treated as constituting one surface. This method of handling is also applicable to the optical path diagrams (FIGS. 5 through 9) for the other examples to be described later. The reference numerals of the diagram have basically the same references as those of FIG. 4. However, this does not mean that they are strictly identical. For example, throughout the diagrams, the lens surfaces closest to the object have the same number (r1), but this does not mean that these curvatures are the same throughout the embodiments.

In the aforementioned configuration, light coming from the object side travels along the optical axis AX to pass throughout the first lens group, second lens group, third lens group and fourth lens group (Gr1, Gr2, Gr3 and Gr4) and parallel flat plate (FT). Then an optical image of an object is formed on the light-receiving surface of the image pickup element (SR). In the image pickup element (SR), the optical image corrected by the parallel flat plate (FT) is converted into electric signal. This electric signal is subjected to predetermined digital image processing and image compression processing, as required, and is recorded in the memory of a mobile phone or mobile information terminal as a digital video signal, which is then transmitted to other digital equipment by wired or wireless means.

Figure 16A:
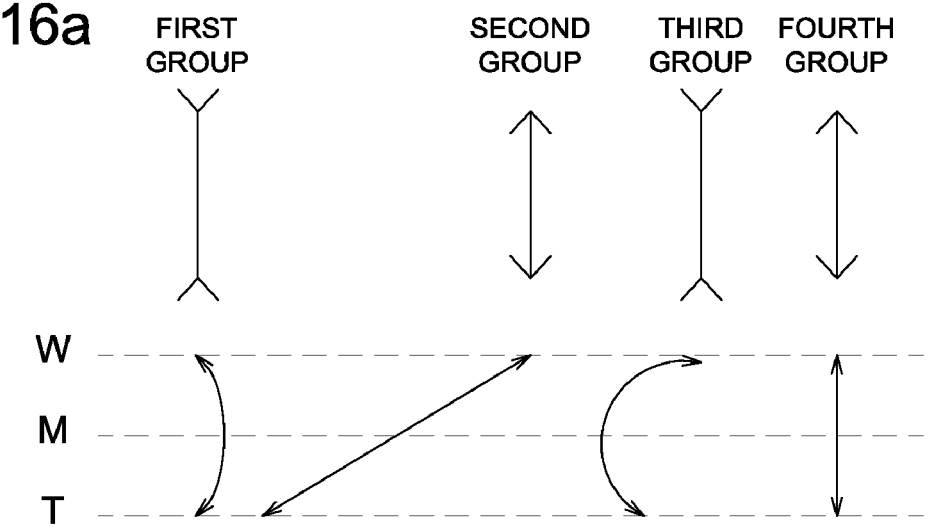
Figure 16B:
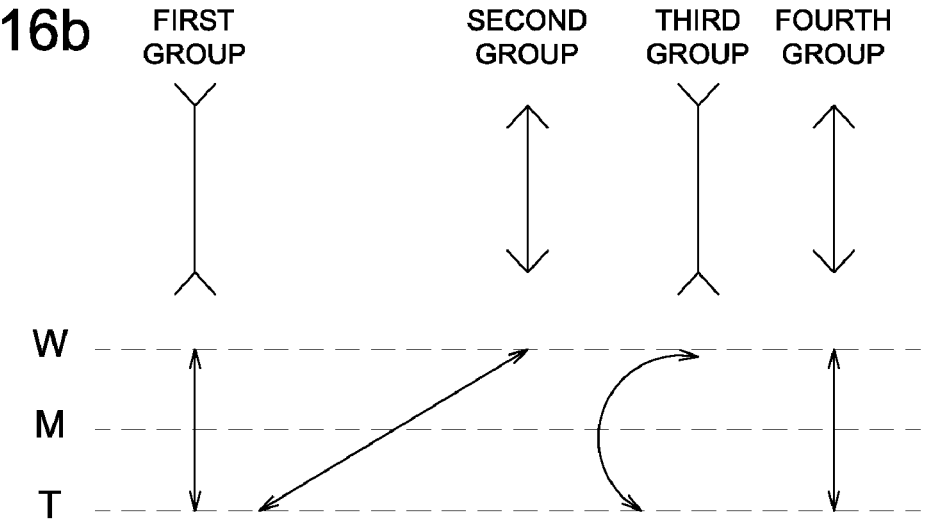
Figure 16C:
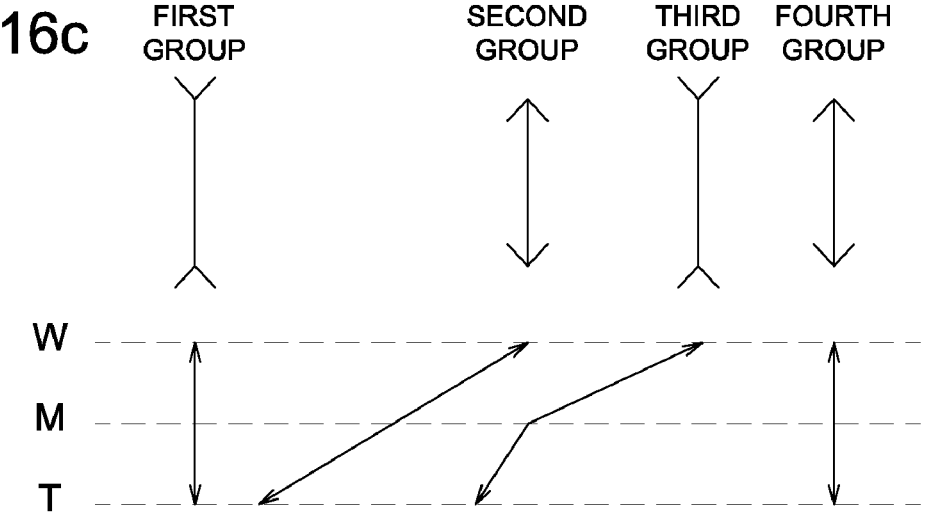
Figure 17:
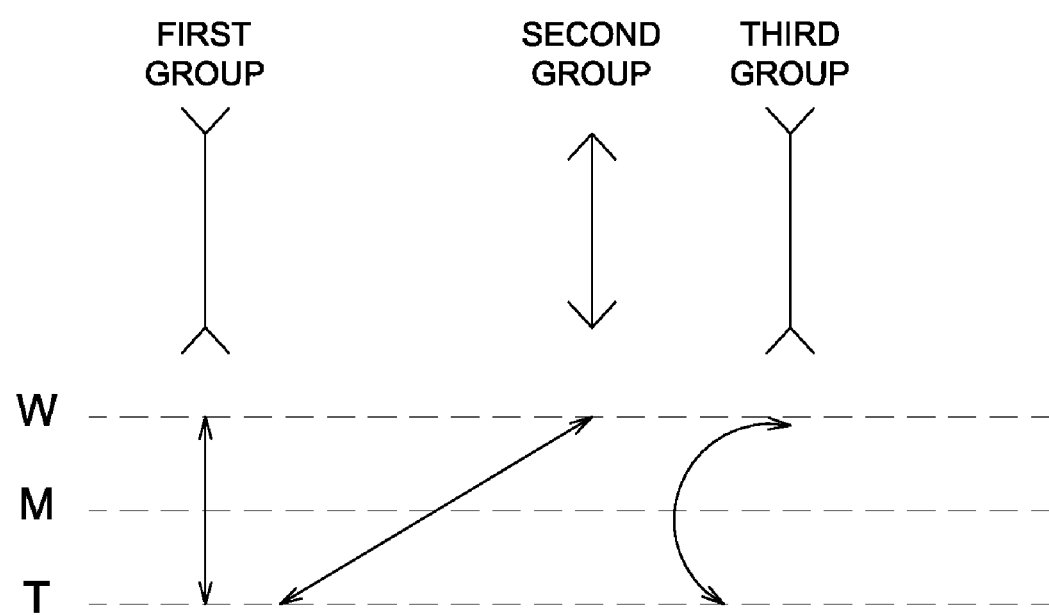
FIG. 17 is a schematic diagram representing the moving direction of the lens groups in the Examples.

FIGS. 16a, 16b and 16c and FIG. 17 are the schematic diagrams representing traveling directions of these lens groups at the time of varying the power. FIGS. 16a, 16b and 16c and FIG. 17 show not only the traveling directions of lens groups in Example 1, but also the traveling directions in Example 2 and succeeding examples. Namely, FIG. 16a indicates the traveling directions of the lens groups in Example 1, and FIG. 16b shows the traveling directions of the lens groups in Example 2. FIG. 16c shows the traveling directions of the lens groups in Example 3, and FIG. 17 represents the traveling directions of the lens groups in Example 4. In FIGS. 16 and 17, the left corresponds to the object side, and the first lens group (Gr1), second lens group (Gr2), third lens group (Gr3) and fourth lens group (Gr4) are arranged in that order as viewed from the object side, similarly to the previously described cases. In the drawings, the reference letter W indicates the wide-angle end exhibiting the minimum focal length and the maximum angle of view. The reference letter T denotes the telephoto end exhibiting the maximum focal length and the minimum angle of view. The reference letter M shows that the focal length is intermediate between the wide-angle end (W) and telephoto end (T). The actual lens groups travel on a straight line along the optical axis. In this diagram, positions of the lens groups at the wide-angle end (W), intermediate point (M) and telephoto end (T) are arranged from top to bottom in the diagram.

As shown in FIG. 16a, in Example 1, the first lens group (Gr1) through the third lens group (Gr3) are movable when the power varies and only the fourth lens group (Gr4) is statically positioned when the power varies. To put it more specifically, when the power varies from wide-angle end (W) to telephoto end (T), the first lens group (Gr1) moves to form a locus in a convex shape projecting to the image side, and the second lens group (Gr2) linearly moves in the direction of coming closer to the object. The third lens group (Gr3) moves to form a locus in a concave shape projecting to the object side. It should be noted, however, that the moving directions of these lens groups and the movement distances may change depending on the optical powers of the lens groups and lens configuration, in this Example as well as the following Examples. For example, in the case of the second lens group (Gr2) in FIGS. 16a, 16b, and 16c, the lens group is shown to linearly move. It can include the cases wherein the lens group moves to form a convex curve projecting to the object side or image side, as well as the cases wherein it moves along a U-turn shape.

Tables 2 and 3 show construction data of each lens in the variable-power optical system 1A of Example 1. In this variable-power optical system 1A, all the lenses (L1 through L6) are designed as bi-aspheric lenses. Further, the first, fifth and sixth lenses (L1, L5 and L6) are resin lenses, and other lenses are glass lenses. Table 16 (to be given later) shows the relevant numerals when the aforementioned conditional expressions (1) through (14) are applied to the optical system of Example 1.

TABLE 2

| Lens surface | Curvature radius (mm) | On-axis distance between surfaces (mm) | | | Refractive index | Abbe number |
|---|---|---|---|---|---|---|
| | | W | M | T | | |
| r1* | −13.770 | 1.536 | | | 1.53048 | 55.72 |
| r2* | 3.935 | 1.568 | | | | |
| r3* | 5.303 | 1.044 | | | 1.79970 | 22.63 |
| r4* | 7.665 | 9.640 | 3.518 | 1.500 | | |
| r5 (Stop) | ∞ | 0.100 | | | | |
| r6* | 2.744 | 2.201 | | | 1.49700 | 81.61 |
| r7* | −6.864 | 0.219 | | | | |
| r8* | −29.712 | 0.709 | | | 1.72958 | 31.79 |
| r9* | 5.768 | 0.679 | 0.583 | 6.347 | | |
| r10* | 7.808 | 0.961 | | | 1.53048 | 55.72 |
| r11* | 6.740 | 0.808 | 4.750 | 2.278 | | |
| r12* | 9.388 | 2.918 | | | 1.53048 | 55.72 |
| r13* | 39.183 | 1.617 | | | | |
| r14 | ∞ | 0.500 | | | 1.51680 | 64.20 |
| r15 | ∞ | 0.500 | | | | |
| r16 (Image plane) | ∞ | | | | | |

TABLE 3

| Lens surface | Conic constant | Aspheric surface coefficient | | | |
|---|---|---|---|---|---|
| | | A | B | C | D |
| r1 | 0 | 3.58E−03 | −1.75E−04 | 4.67E−06 | −5.36E−08 |
| r2 | 0 | 2.38E−04 | 5.40E−04 | −2.54E−05 | −9.85E−07 |
| r3 | 0 | −4.31E−03 | 3.73E−04 | −8.31E−06 | −6.32E−07 |
| r4 | 0 | −3.75E−03 | 2.38E−04 | −3.50E−06 | −5.95E−07 |
| r6 | 0 | −1.63E−03 | −1.43E−04 | −1.21E−05 | −6.93E−06 |
| r7 | 0 | 4.69E−03 | −1.53E−03 | 2.64E−04 | −2.40E−05 |
| r8 | 0 | 1.96E−04 | −2.33E−03 | 5.47E−04 | −7.66E−05 |
| r9 | 0 | 6.87E−03 | 8.08E−05 | 4.02E−04 | 1.02E−05 |
| r10 | 0 | −6.67E−04 | 3.37E−04 | −8.83E−06 | −4.05E−07 |
| r11 | 0 | −7.06E−04 | 2.84E−04 | 2.19E−05 | −2.15E−06 |
| r12 | 0 | 9.83E−04 | −1.34E−04 | 2.50E−05 | −8.11E−07 |
| r13 | 0 | 3.50E−03 | −4.95E−04 | 5.35E−05 | −9.76E−07 |

Table 2 shows the number of each lens surface; curvature radius of each surface (in terms of mm); distances on the optical axis between lens surfaces (on-axis distance between surfaces in terms of mm) when the focal position is adjusted to the infinity, at the wide-angle end (W), intermediate point (M) and telephoto end (T); refractive index of each lens, and Abbe number, in that order as viewed from the left. The blank field of the on-axis distance between surfaces M and T shows the same value as that in the "W" column. Further, the on-axis distance between surfaces indicates the distance calculated on the assumption that air is present as a medium in the area between a pair of opposed surfaces. Here, the numbers ri (i=1, 2, 3, . . . ) labeled to the lens surfaces indicates i-th optical surface when counted from the object side on the optical path. The surface with "ri" affixed with "*" is an aspheric surface (i.e., a refractive optical surface in an aspheric shape or a surface with a refractive action equivalent to an aspheric surface). The optical stop (ST), both surfaces of the parallel flat plate (FT) and the light-receiving surface of the image pickup element (SR) are flat and the curvature radius thereof is infinite.

An aspheric shape of an optical surface can be defined by the following formula (16) using the local orthogonal coordinates (x, y and z) wherein the tip of the surface is an origin, and the direction from the object to the image pickup element is the positive direction on the z-axis.

[Mathematical Formula 2]

$$z = \frac{ch^2}{1 + SQRT\{1 - (1+k)c^2h^2\}} + Ah^4 + Bh^6 + Ch^8 + Dh^{10} + Eh^{12} + Fh^{14} + Gh^{16} \quad (16)$$

Wherein, z is the amount of displacement in the z-axis direction at height h (measured from the surface tip), h is the height perpendicular to the z axis ($h^2=x^2+y^2$);

c is a paraxial curvature (=1/curvature radius);

A, B, C, D, E, F and G are the fourth, sixth, tenth, twelfth, fourteenth and sixteenth order aspheric surface coefficients, respectively; and k is a conic constant.

As will be apparent from the formula (16), a curvature radius of an aspheric surface of Table 2 shows a value at a position around the tip of the lens surface. Table 3 shows conic constant k of a surface defined as an aspheric surface (a surface labeled "ri" affixed with "*" in Table 2), and values for aspherical surface coefficients A, B, C and D.

Figure 10:
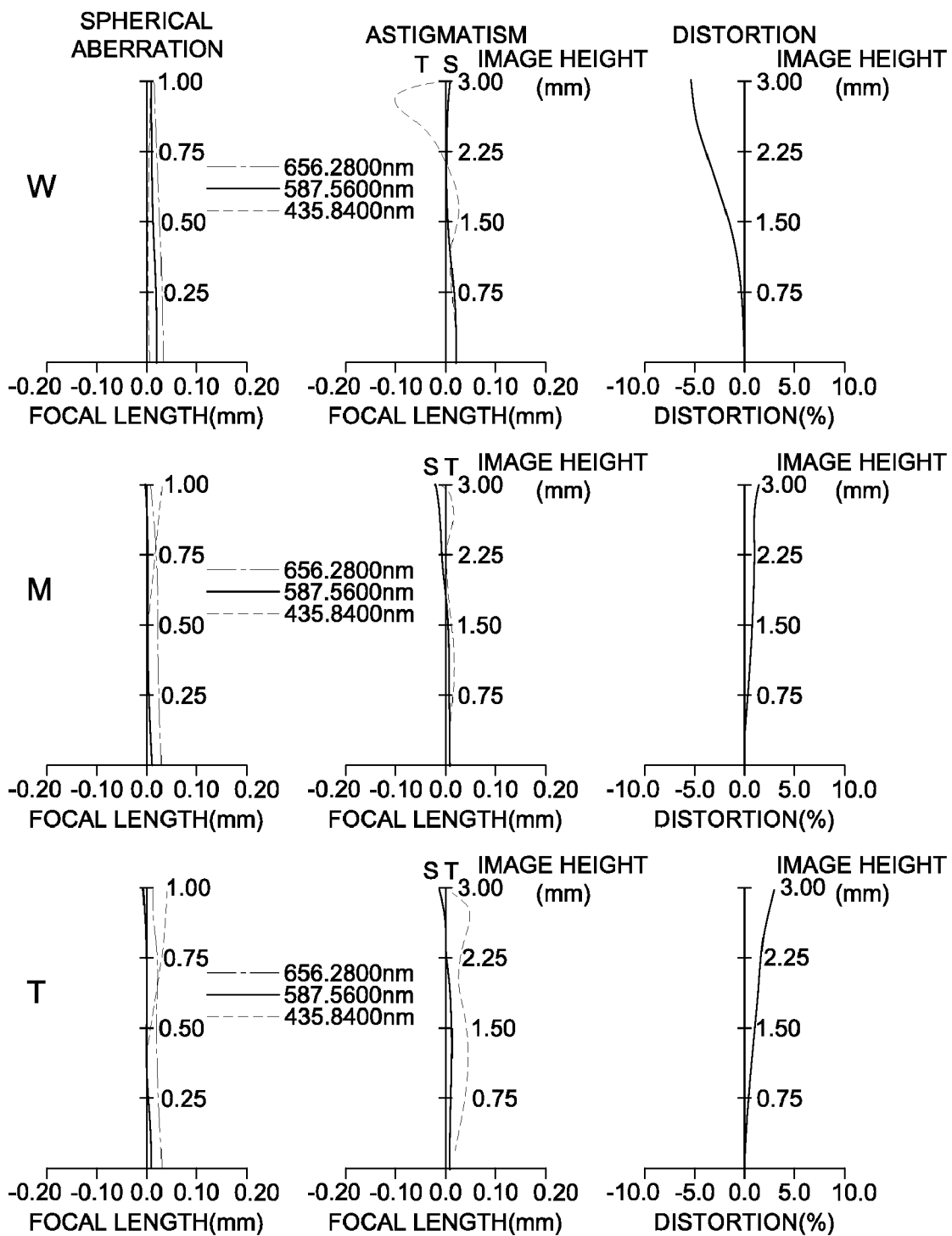
FIG. 10 is an aberration diagram representing spherical aberration, astigmatism and distortion of lens groups in Example 1.
Figure 11:
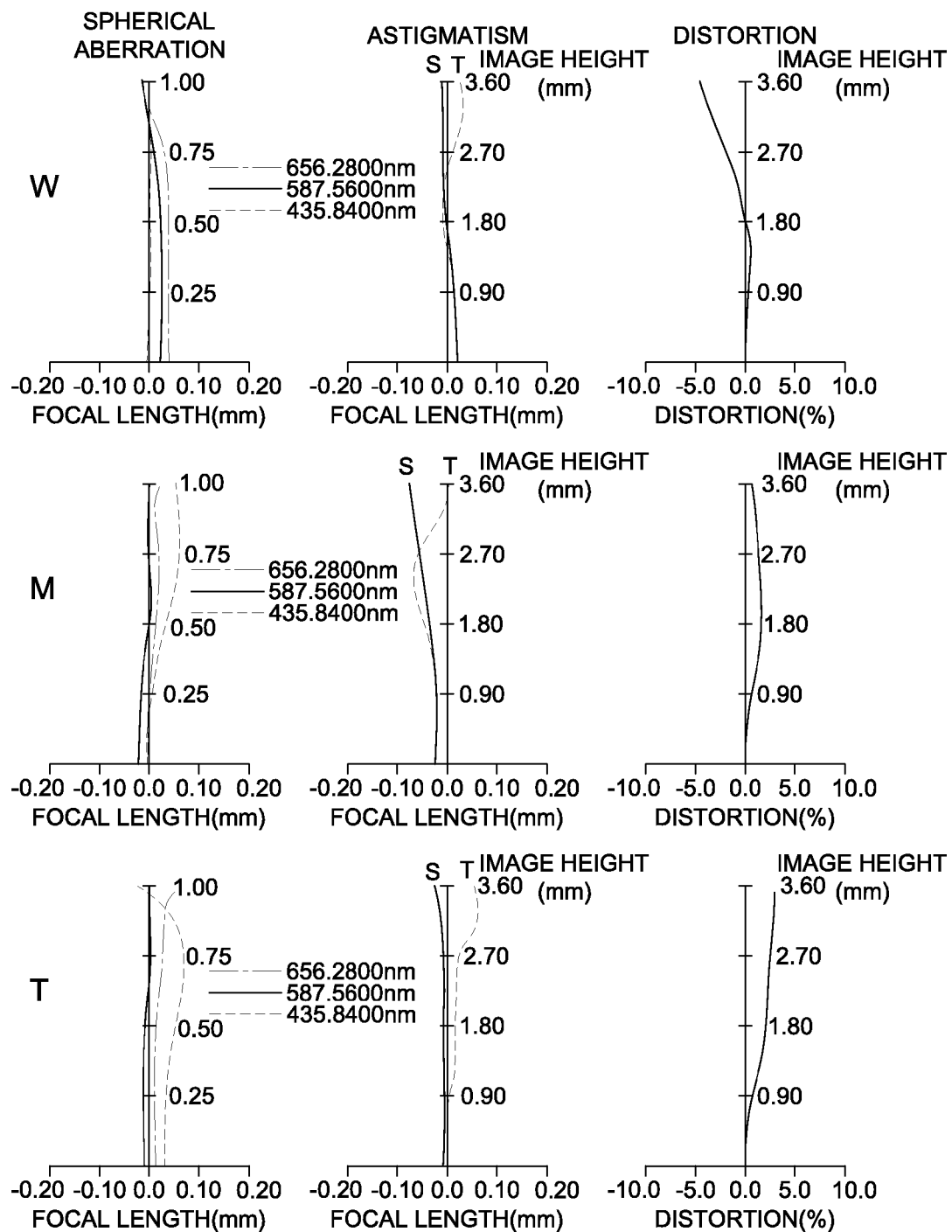
FIG. 11 is an aberration diagram representing spherical aberration, astigmatism and distortion of lens groups in Example 2.
Figure 12:
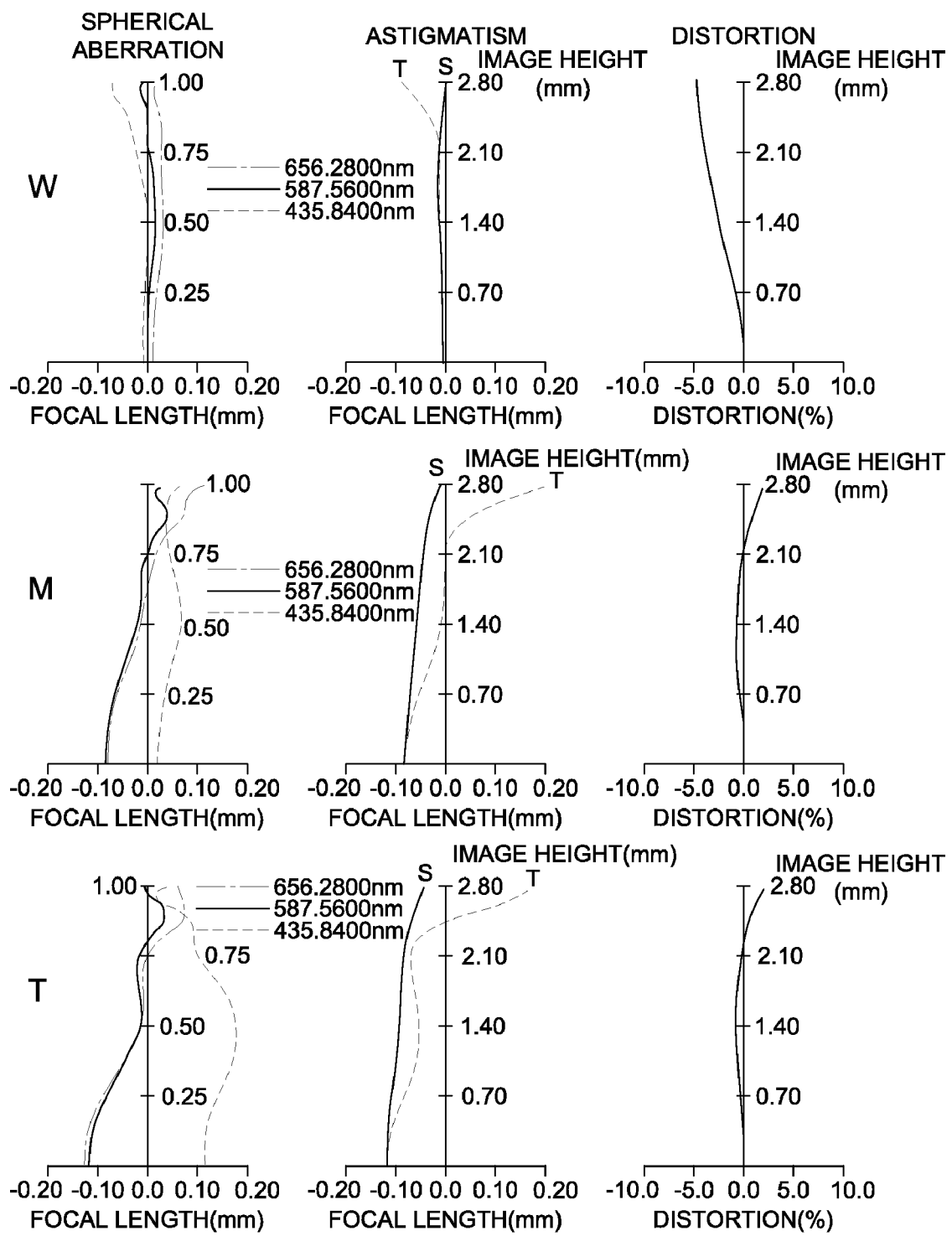
FIG. 12 is an aberration diagram representing spherical aberration, astigmatism and distortion of lens groups in Example 3.
Figure 13:
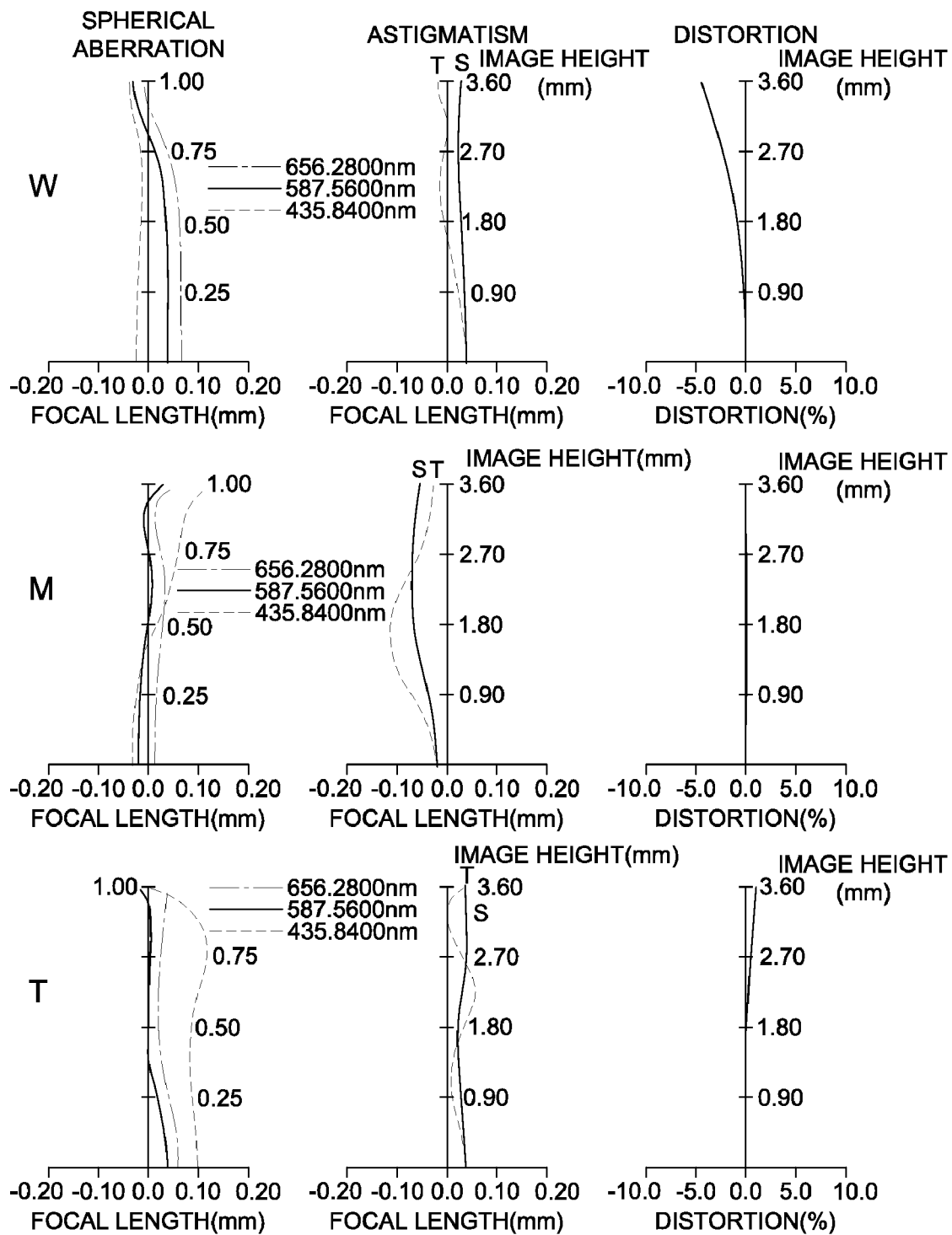
FIG. 13 is an aberration diagram representing spherical aberration, astigmatism and distortion of lens groups in Example 4.
Figure 14:
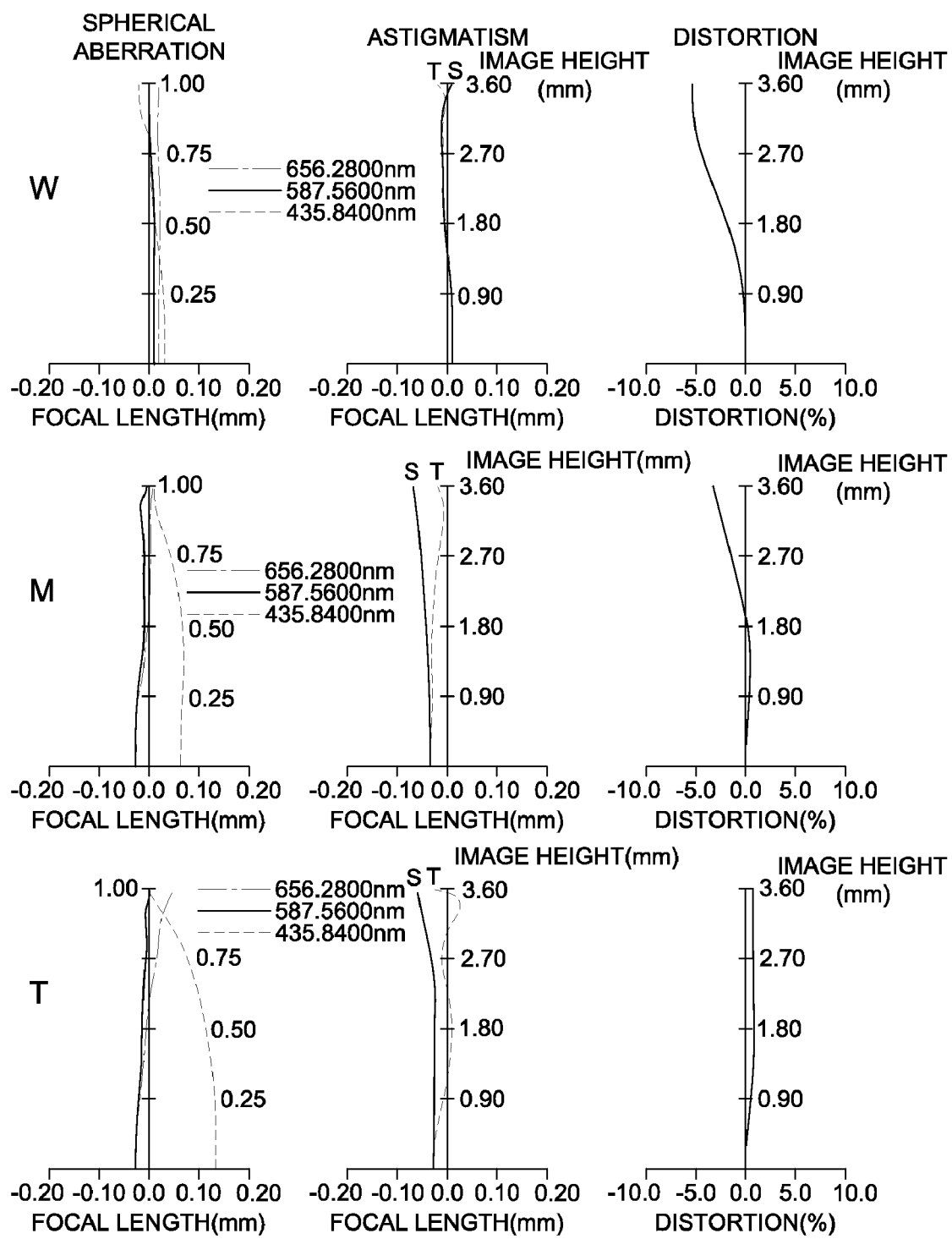
FIG. 14 is an aberration diagram representing spherical aberration, astigmatism and distortion of lens groups in Example 5.
Figure 15:
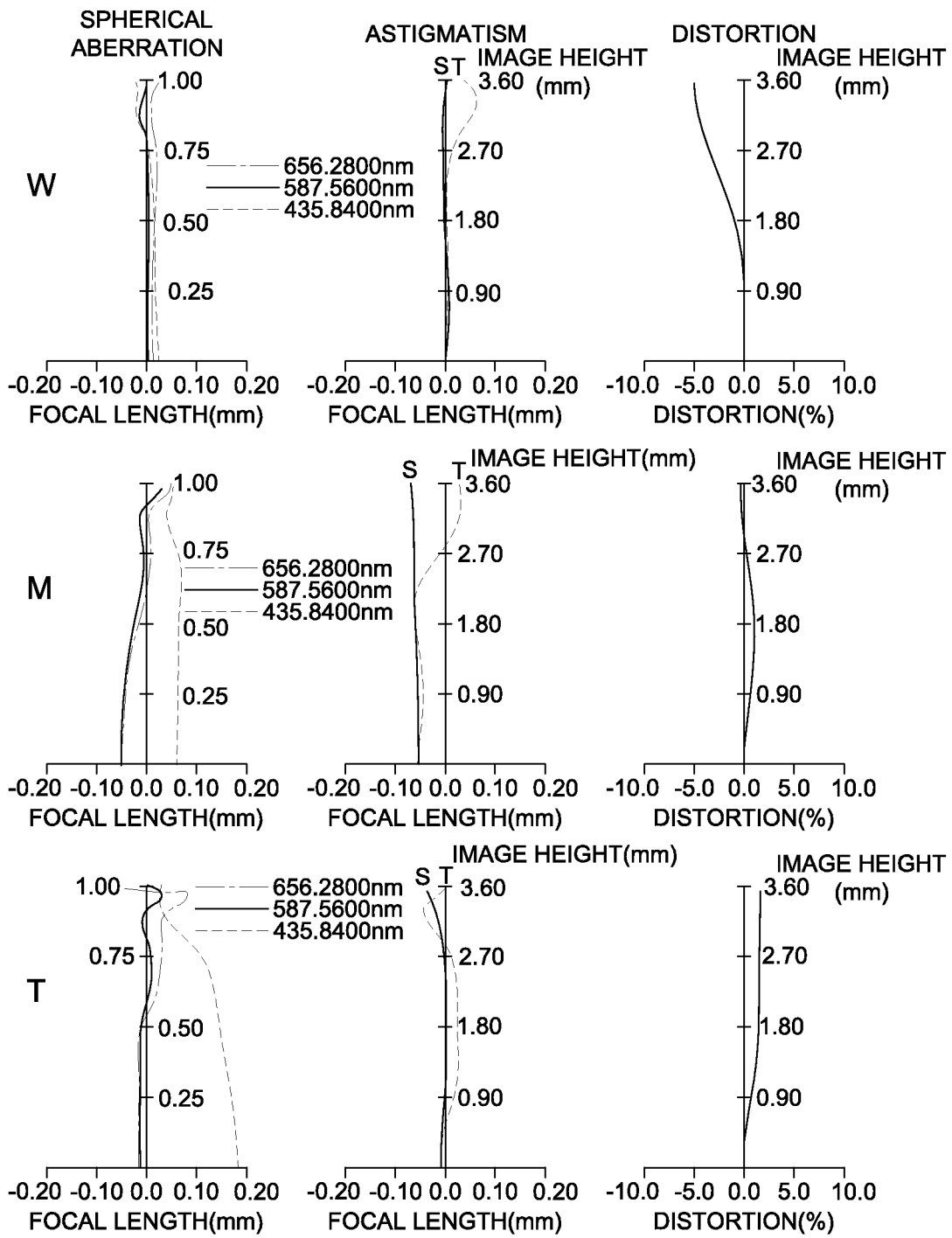
FIG. 15 is an aberration diagram representing spherical aberration, astigmatism and distortion of lens groups in Example 6.

FIG. 10 shows spherical aberration (LONGITUDINAL SPHERICAL ABERRATION), astigmatism (ASTIGMATISM) and distortion (DISTORTION) of the entire optical system in Example 1 in that order as viewed from the left, based on the aforementioned lens arrangement and configuration. In this diagram, the upper level shows aberrations at the wide-angle end (W), the intermediate level shows aberrations at the intermediate point (M), and the lower level shows aberrations at the telephoto end (T). The horizontal axis for the spherical aberration and astigmatism indicates the shift of the focal position in terms of "mm", and the horizontal axis for distortion shows the amount of distortion in terms of percentage with respect to the total amount. The vertical axis for the spherical aberration represents a value normalized with respect to the height of incidence. The vertical axis for astigmatism and distortion shows the values in terms of the image height (in mm).

In the diagram illustrating the spherical aberration, aberrations at the time of using three beams of light having different wavelengths are shown. Namely, the one-dot chain line indicates a red color (with a wavelength of 656.28 nm), the solid line denotes a yellow color (so-called d-line with a wavelength of 587.56 nm), and the broken line represents a blue color (with a wavelength of 435.84 nm). In the astigmatism diagram, reference letters s and t indicate the results on the sagittal (radial) surface and tangential (meridional) surface, respectively. Further, the astigmatism and distortion diagram shows the results of using the aforementioned yellow line (d-line). As will be apparent, FIG. 10 suggests excellent optical characteristics wherein the distortion of the lens group in Example 1 is kept at 5% or less at any of the wide-angle end (W), intermediate point (M) and telephoto end (T). Tables 14 and 15 show the focal lengths (in mm) and F values at the wide-angle end (W), intermediate point (M) and telephoto end (T) in Example 1, respectively. These Tables demonstrate that an optical system with a short focal length and excellent performance in terms of speed is realized in the present invention.

Example 2

Figure 5:
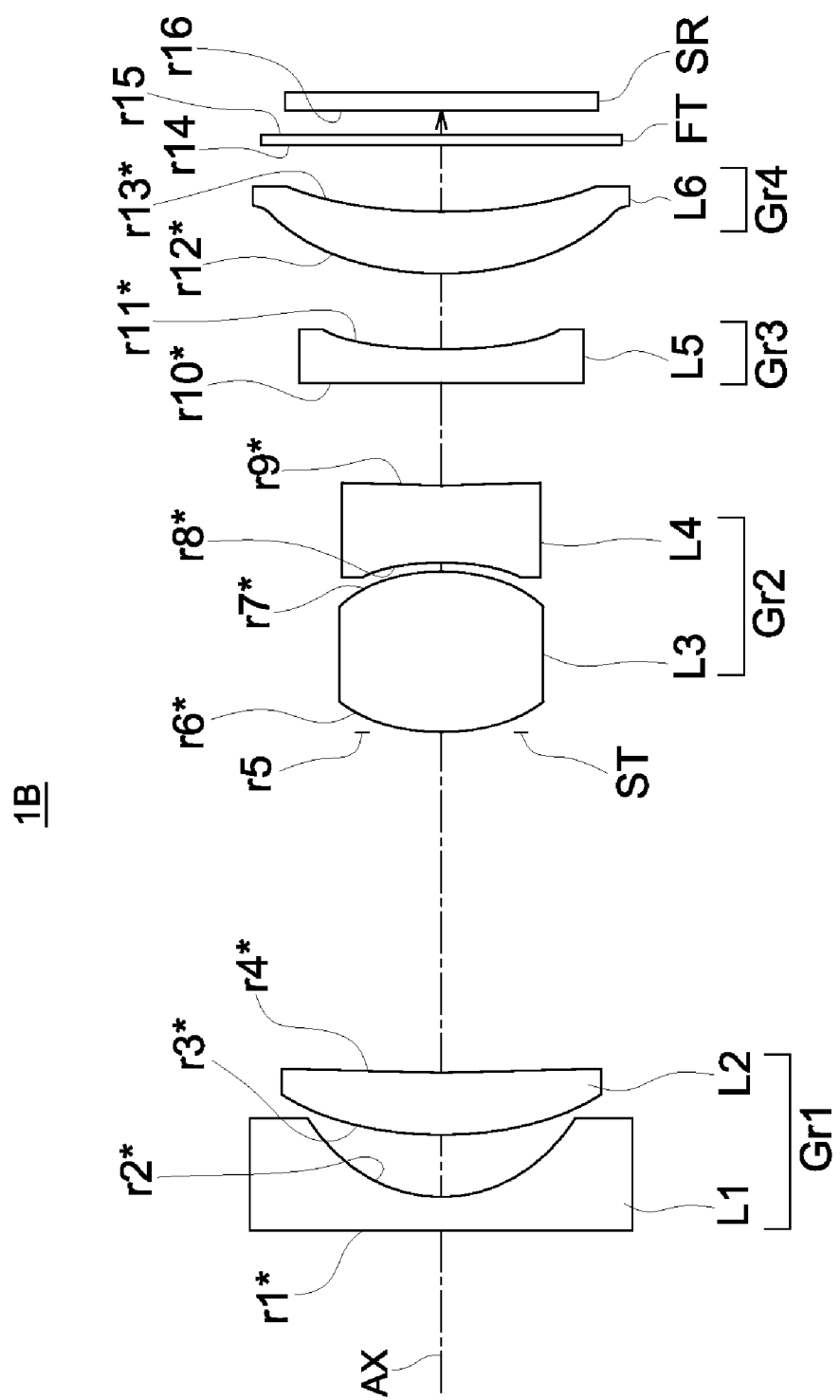
FIG. 5 is a cross sectional view showing the optical path at the wide-angle end of the variable-power optical system relating to Example 2.

FIG. 5 is a cross sectional view traversing the optical axis (AX), representing the arrangement of the lens groups in the variable-power optical system 1B in Example 2. The variable-power optical system 1B in Example 2 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) arranged in that order as viewed from the object side. The third lens group (Gr3) is composed of one negative meniscus lens (L5) with a convex surface facing the object side. The fourth lens group (Gr4) is composed of one positive meniscus lens (L6) with a convex surface facing the object side.

In the variable-power optical system 1B with the above lens configuration in the Example 2, when the power varies from the wide-angle end (W) to the telephoto end (T), the second lens group (Gr2) linearly moves toward the object and the third lens group (Gr3) makes a U-turn to form a convex shape projecting to the object side, as shown in FIG. 16b. The first lens group (Gr1) and fourth lens group (Gr4) are statically positioned. The optical stop (ST) travels together with the second lens group (Gr2) at the time of varying the power.

Tables 4 and 5 show the construction data of each lens in the variable-power optical system 1B in Example 2. As shown in these Tables and FIG. 5, all the lenses (L1 through L6) are designed as bi-aspheric lenses in Example 2. The fifth and sixth lenses (L5 and L6) are resin lenses and other lenses are glass lenses.

TABLE 4

| Lens surface | Curvature radius (mm) | On-axis distance between surfaces (mm) | | | Refractive index | Abbe number |
|---|---|---|---|---|---|---|
| | | W | M | T | | |
| r1* | −38.691 | 0.800 | | | 1.68980 | 52.82 |
| r2* | 4.146 | 1.485 | | | | |
| r3* | 9.218 | 1.495 | | | 1.80542 | 26.13 |
| r4* | 29.545 | 8.035 | 4.066 | 0.600 | | |
| r5 (Stop) | ∞ | 0.000 | | | | |
| r6* | 4.353 | 3.809 | | | 1.58913 | 61.24 |
| r7* | −4.607 | 0.178 | | | | |
| r8* | −6.980 | 1.837 | | | 1.80542 | 26.13 |
| r9* | 42.756 | 2.471 | 1.889 | 6.138 | | |
| r10* | 49.486 | 0.761 | | | 1.53048 | 55.72 |
| r11* | 9.245 | 1.775 | 6.327 | 5.543 | | |
| r12* | 8.760 | 1.419 | | | 1.58340 | 30.23 |
| r13* | 27.515 | 1.634 | | | | |
| r14 | ∞ | 0.300 | | | 1.51680 | 64.20 |
| r15 | ∞ | 0.500 | | | | |
| r16 (Image plane) | ∞ | | | | | |

TABLE 5

| Lens surface | Conic constant | Aspheric surface coefficient | | | | | | |
|---|---|---|---|---|---|---|---|---|
| | | A | B | C | D | E | F | G |
| r1 | 0 | 3.04E−03 | −1.45E−04 | −4.69E−06 | 6.56E−07 | −2.39E−08 | 3.00E−10 | 0.00E+00 |
| r2 | 0 | 1.26E−03 | 3.64E−04 | −2.57E−05 | −1.78E−07 | −1.91E−07 | 9.40E−09 | 0.00E+00 |
| r3 | 0 | −2.36E−03 | 3.47E−04 | −3.67E−06 | −8.01E−07 | −3.46E−08 | 3.10E−09 | 0.00E+00 |
| r4 | 0 | −2.16E−03 | 1.88E−04 | −7.73E−06 | 9.97E−07 | −2.59E−07 | 2.03E−08 | −4.00E−10 |
| r6 | 0 | −1.15E−03 | −5.40E−05 | −1.25E−05 | −2.28E−06 | 4.86E−07 | −1.52E−07 | 0.00E+00 |
| r7 | 0 | 5.62E−04 | −3.66E−04 | −4.37E−05 | 3.63E−07 | 9.39E−07 | 7.50E−09 | 0.00E+00 |
| r8 | 0 | −1.64E−03 | −3.69E−04 | −2.49E−05 | −8.14E−06 | −9.25E−07 | 5.52E−07 | 0.00E+00 |
| r9 | 0 | 1.42E−03 | 1.48E−04 | −5.23E−06 | −4.17E−07 | 0.00E+00 | 0.00E+00 | 0.00E+00 |
| r10 | 0 | −3.81E−03 | 8.40E−04 | −1.51E−04 | 2.20E−05 | −1.85E−06 | 6.06E−08 | 0.00E+00 |
| r11 | 0 | −3.89E−03 | 9.22E−04 | −1.54E−04 | 1.93E−05 | −1.33E−06 | 3.47E−08 | 0.00E+00 |
| r12 | −1 | 3.36E−03 | −7.17E−04 | 8.48E−05 | −5.18E−06 | 1.77E−07 | −2.80E−09 | 0.00E+00 |
| r13 | 0 | 7.38E−03 | −1.50E−03 | 1.55E−04 | −8.30E−06 | 2.48E−07 | −3.80E−09 | 0.00E+00 |

Example 3

Figure 6:
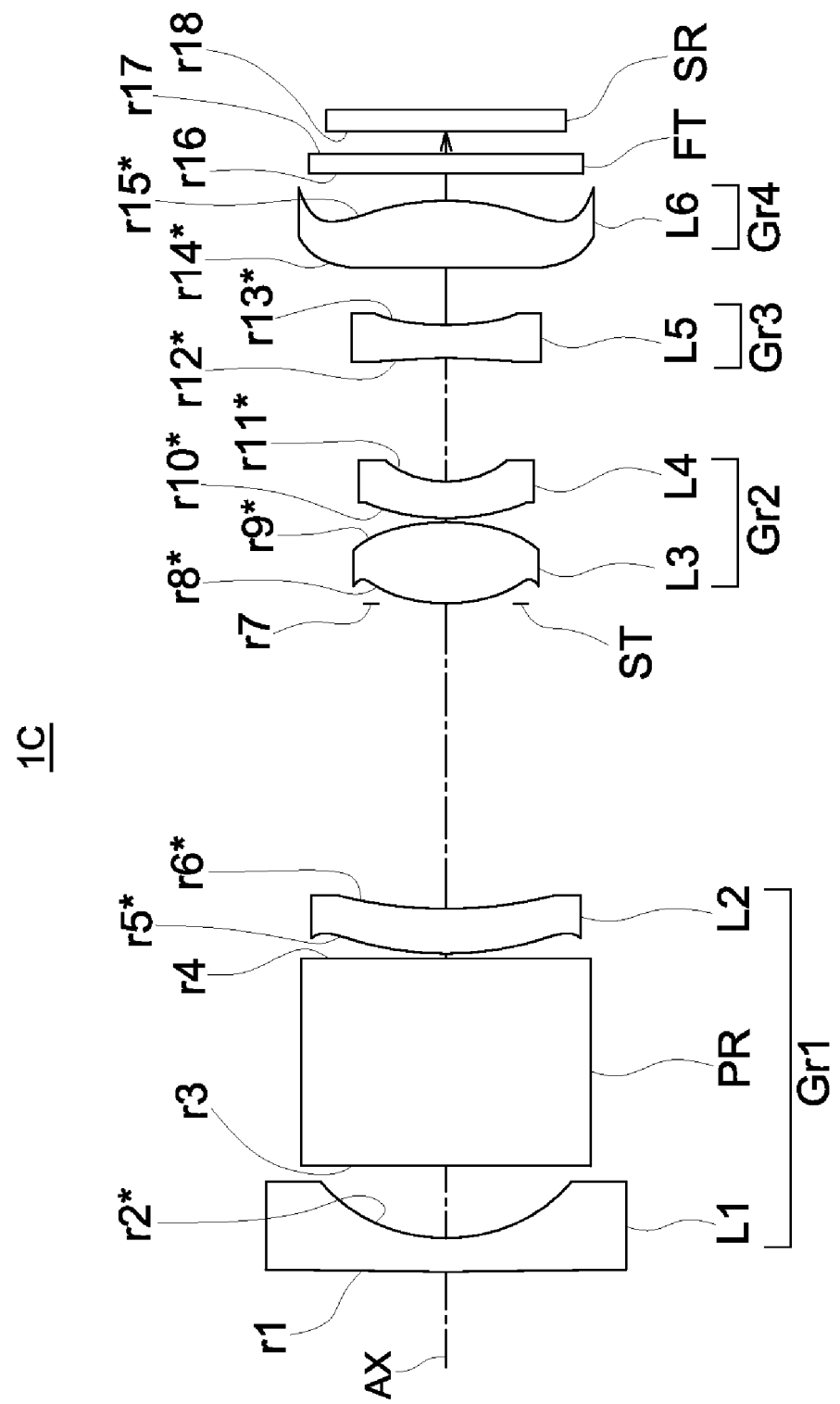
FIG. 6 is a cross sectional view showing the optical path at the wide-angle end relating to the variable-power optical system in Example 3.

FIG. 6 is a cross sectional view traversing the optical axis (AX), representing the arrangement of the lens group in the variable-power optical system 1C of Example 3. The variable-power optical system 1C of Example 3 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a negative meniscus lens (L1) with a convex surface facing the object side, a flat plate (PR) corresponding to a prism for turn-back the optical path and a positive meniscus lens (L2) with a convex surface with the object side, in that order as viewed from the object side. The second lens group (Gr2) is composed of a biconvex positive lens (L3) and a negative meniscus lens (L4) with a convex surface facing the object side, in that order as viewed from the object side. The third lens group (Gr3) is composed of one biconcave negative lens (L5). The fourth lens group (Gr4) is composed of one biconvex positive lens (L6).

In the variable-power optical system 1C having the aforementioned lens configuration in Example 3, when the power varies from the wide-angle end (W) to the telephoto end (T), the second lens group (Gr2) linearly moves toward the object, and the third lens group (Gr3) linearly moves toward the object in the manner of shifting the traveling speed at the intermediate point (M), as shown in FIG. 16c. In the meantime, the first lens group (Gr1) and fourth lens group (Gr4) are statically positioned. The optical stop (ST) travels together with the second lens group (Gr2) at the time of varying the power.

Tables 6 and 7 show the construction data of each lens in the variable-power optical system 1C of Example 3. As shown in these Tables and FIG. 6, the second through sixth lenses (L2 through L6) are designed as bi-aspheric lenses in Example 3. The first lens (L1) is designed as a lens with a single aspheric surface. All the lenses (L1 through L6) are glass lenses.

TABLE 6

| Lens surface | Curvature radius (mm) | On-axis distance between surfaces (mm) | | | Refractive index | Abbe number |
|---|---|---|---|---|---|---|
| | | W | M | T | | |
| r1 | 128.840 | 0.800 | | | 1.75450 | 51.57 |
| r2* | 4.310 | 1.657 | | | | |
| r3 | ∞ | 5.000 | | | 1.92286 | 20.88 |
| r4 | ∞ | 0.100 | | | | |
| r5* | 9.440 | 1.068 | | | 1.84666 | 23.82 |
| r6* | 13.982 | 7.186 | 3.185 | 0.600 | | |
| r7 (Stop) | ∞ | 0.000 | | | | |
| r8* | 3.351 | 1.928 | | | 1.49700 | 81.61 |
| r9* | −4.954 | 0.100 | | | | |
| r10* | 5.419 | 0.847 | | | 1.70401 | 27.84 |
| r11* | 2.658 | 2.984 | 2.314 | 2.876 | | |
| r12* | −19.975 | 0.800 | | | 1.69937 | 48.51 |
| r13* | 8.949 | 1.329 | 6.000 | 8.022 | | |
| r14* | 764.333 | 1.602 | | | 1.85000 | 39.90 |
| r15* | −6.478 | 0.600 | | | | |
| r16 | ∞ | 0.500 | | | 1.51680 | 64.20 |
| r17 | ∞ | 0.500 | | | | |
| r18 (Image plane) | ∞ | | | | | |

TABLE 7

| Lens surface | Conic constant | Aspheric surface coefficient | | | | | | |
|---|---|---|---|---|---|---|---|---|
| | | A | B | C | D | E | F | G |
| r2 | 0 | −3.72E−04 | −1.43E−06 | 2.15E−06 | −7.63E−07 | 0.00E+00 | 0.00E+00 | 0.00E+00 |
| r5 | 0 | 4.82E−04 | 4.30E−05 | 1.64E−05 | −3.62E−06 | 0.00E+00 | 0.00E+00 | 0.00E+00 |
| r6 | 0 | 4.56E−04 | −1.70E−05 | 4.68E−05 | −6.53E−06 | −7.44E−07 | 1.21E−07 | −4.10E−09 |
| r8 | 0 | −4.62E−03 | 2.66E−04 | −5.01E−04 | 2.58E−04 | −1.20E−04 | 3.32E−05 | −3.68E−06 |
| r9 | 0 | 3.03E−03 | 1.30E−04 | −3.32E−04 | 1.76E−04 | −3.64E−05 | 1.33E−06 | −8.90E−09 |
| r10 | 0 | −1.24E−03 | −1.67E−03 | 1.37E−03 | −2.39E−04 | 1.86E−14 | 0.00E+00 | 0.00E+00 |
| r11 | 0 | −5.92E−04 | −3.46E−03 | 2.91E−03 | −6.20E−04 | 1.09E−15 | 0.00E+00 | 0.00E+00 |
| r12 | −1 | 9.91E−03 | −4.88E−03 | 4.37E−04 | −7.94E−06 | 1.47E−07 | 0.00E+00 | 0.00E+00 |
| r13 | −1 | 1.27E−02 | −4.53E−03 | 4.62E−04 | −8.15E−06 | 3.94E−07 | 0.00E+00 | 0.00E+00 |
| r14 | −1 | −3.83E−03 | 9.25E−04 | −5.24E−05 | 1.80E−06 | 0.00E+00 | 0.00E+00 | 0.00E+00 |
| r15 | −1 | −5.14E−03 | 1.38E−03 | −1.09E−04 | 5.38E−06 | 0.00E+00 | 0.00E+00 | 0.00E+00 |

Example 3 gives an instance of using a prism to reduce the size of the lens unit along the thickness. It goes without saying that a reflection mirror can be used instead of the optical path turn-back member.

Example 4

Figure 7:
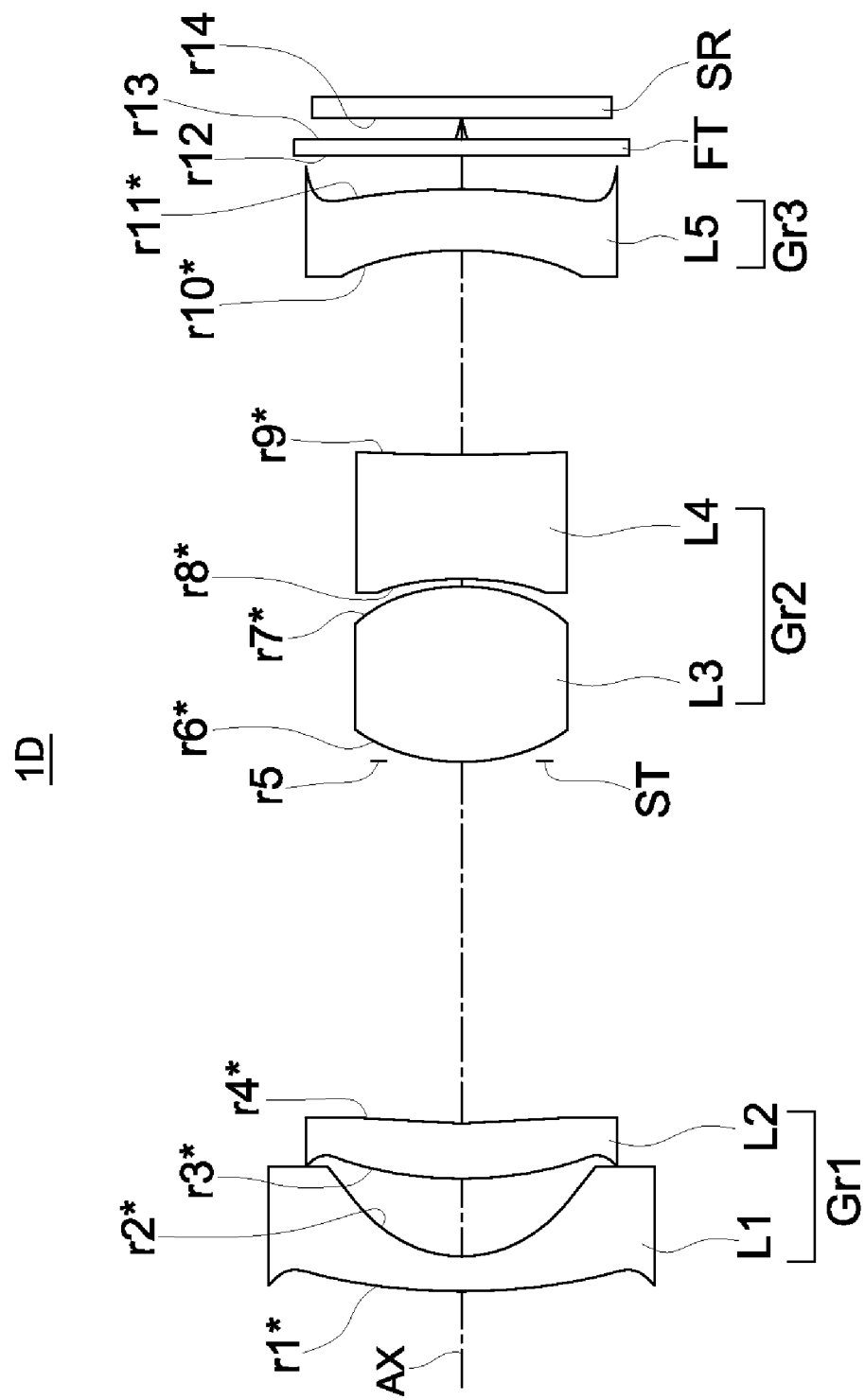
FIG. 7 is a cross sectional view showing the optical path at the wide-angle end of the variable-power optical system relating to Example 4.

FIG. 7 is a cross sectional view traversing the optical axis (AX), representing the arrangement of the lens group in the variable-power optical system 1D of Example 4. The variable-power optical system 1D of Example 4 includes a first lens group (Gr1) having a negative optical power as a whole, an optical stop (ST), a second lens group (Gr2) having a positive optical power as a whole, and a third lens group (Gr3) having a negative optical power, in that order as viewed from the object side. To put it in more detail, the first lens group (Gr1) is composed of a negative meniscus lens (L1) with a convex surface facing the object side, and a positive meniscus lens (L2) with a convex surface facing the object side, in that order as viewed from the object side. The second lens group (Gr2) is composed of a biconvex positive lens (L3) and a biconcave negative lens (L4), in that order as viewed from the object side. The third lens group (Gr3) is composed of one negative meniscus lens (L5) with a convex surface facing the image side.

In the variable-power optical system 1D having the aforementioned lens configuration, when the power varies from the wide-angle end (W) to the telephoto end (T), the second lens group (Gr2) linearly moves toward the object, and the third lens group (Gr3) makes a U-turn to form a convex shape projecting the object side, as shown in FIG. 17. In the meantime, the first lens group (Gr1) is statically positioned. The optical stop (ST) travels together with the second lens group (Gr2) at the time of varying the power.

Tables 8 and 9 show the construction data of each lens in the variable-power optical system 1D of Example 4. As shown in these Tables and FIG. 7, all the lenses (L1 through L5) are designed as bi-aspheric lenses. The fifth lens (L5) is a resin lens and other lenses are glass lenses.

TABLE 8

| Lens surface | Curvature radius (mm) | On-axis distance between surfaces (mm) | | | Refractive index | Abbe number |
|---|---|---|---|---|---|---|
| | | W | M | T | | |
| r1* | 26.915 | 0.874 | | | 1.68980 | 52.82 |
| r2* | 3.850 | 1.827 | | | | |
| r3* | 9.748 | 1.351 | | | 1.80542 | 26.13 |
| r4* | 16.709 | 8.847 | 3.572 | 0.600 | | |
| r5 (Stop) | ∞ | 0.000 | | | | |
| r6* | 4.875 | 4.291 | | | 1.58913 | 61.24 |
| r7* | −5.586 | 0.156 | | | | |
| r8* | −9.318 | 3.000 | | | 1.80542 | 26.13 |
| r9* | 170.599 | 5.014 | 2.946 | 7.997 | | |
| r10* | −6.962 | 1.469 | | | 1.53048 | 55.72 |
| r11* | −13.117 | 0.872 | 8.214 | 6.136 | | |
| r12 | ∞ | 0.300 | | | 1.51680 | 64.20 |
| r13 | ∞ | 0.500 | | | | |
| r14 (Image plane) | ∞ | | | | | |

TABLE 9

| Lens surface | Conic constant | Aspheric surface coefficient | | | | | | |
|---|---|---|---|---|---|---|---|---|
| | | A | B | C | D | E | F | G |
| r1 | 0 | 2.15E−03 | −6.60E−05 | −8.98E−06 | 6.73E−07 | −1.58E−08 | 2.84E−11 | 0.00E+00 |
| r2 | 0 | 1.64E−03 | 3.04E−04 | −3.36E−05 | 1.52E−06 | −1.75E−07 | −2.00E−10 | 0.00E+00 |
| r3 | 0 | −2.39E−03 | 3.27E−04 | 1.92E−06 | −1.04E−06 | −3.68E−08 | 1.10E−09 | 0.00E+00 |
| r4 | 0 | −2.96E−03 | 2.60E−04 | −6.04E−06 | 5.72E−07 | −2.96E−07 | 1.97E−08 | −3.00E−10 |
| r6 | 0 | −9.91E−04 | −5.43E−05 | 3.18E−07 | −1.22E−06 | −1.50E−07 | −2.90E−09 | 0.00E+00 |
| r7 | 0 | −9.86E−04 | −3.51E−04 | −1.22E−05 | 3.04E−06 | 6.16E−07 | −7.48E−08 | 0.00E+00 |
| r8 | 0 | −2.01E−03 | −3.15E−04 | −1.41E−05 | 9.68E−08 | 7.45E−07 | −3.23E−08 | 0.00E+00 |
| r9 | 0 | 1.14E−03 | 6.17E−05 | 3.72E−05 | 4.47E−08 | 0.00E+00 | 0.00E+00 | 0.00E+00 |
| r10 | 0 | −1.79E−04 | 4.58E−04 | −1.43E−04 | 2.46E−05 | −1.93E−06 | 5.76E−08 | 0.00E+00 |
| r11 | 0 | −6.63E−04 | 6.21E−04 | −1.65E−04 | 2.29E−05 | −1.53E−06 | 4.05E−08 | 0.00E+00 |

Example 5

Figure 8:
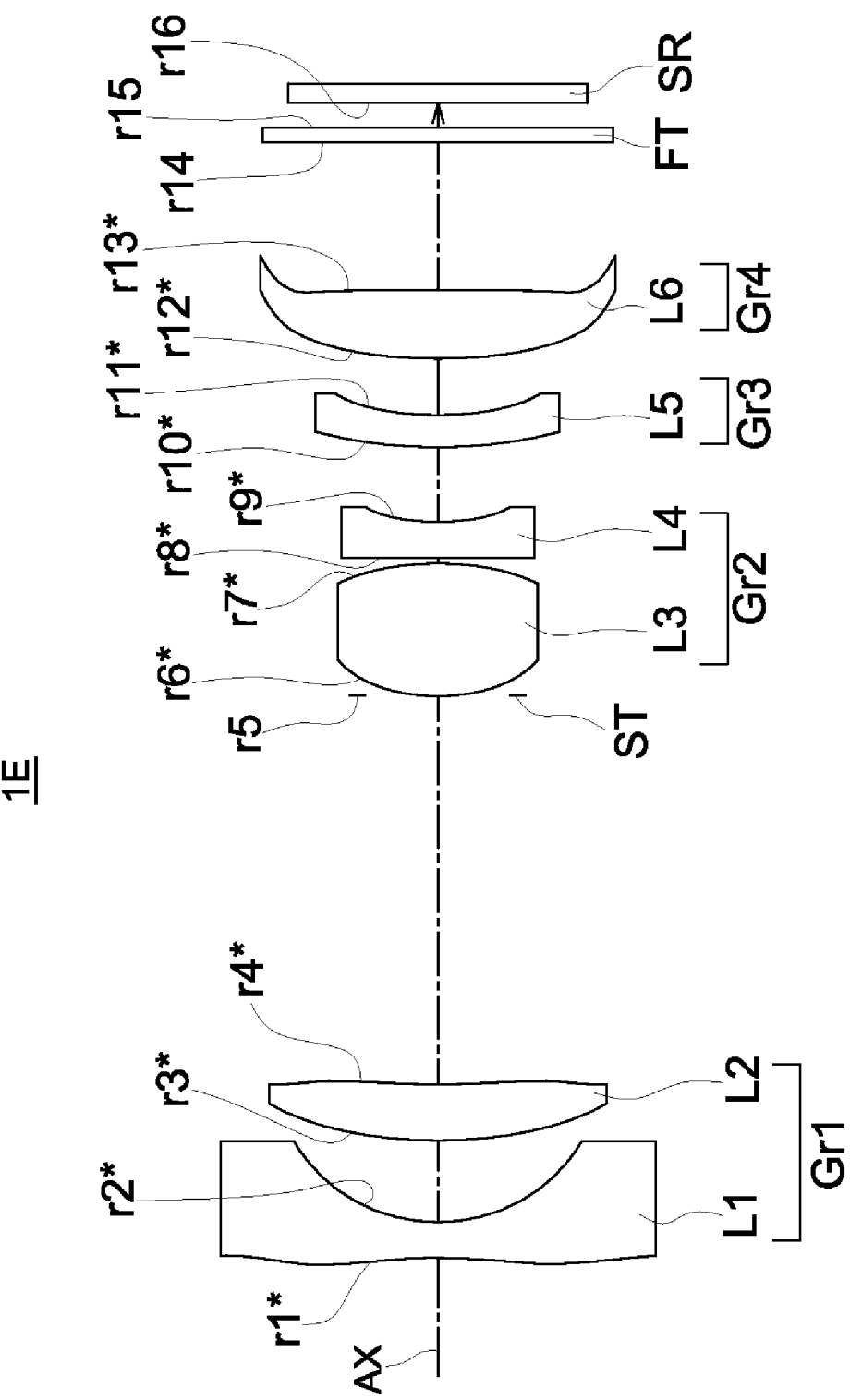
FIG. 8 is a cross sectional view showing the optical path at the wide-angle end of the variable-power optical system relating to Example 5.

FIG. 8 is a cross sectional view traversing the optical axis (AX), representing the arrangement of the lens group in the variable-power optical system 1E of Example 5. The variable-power optical system 1E of Example 5 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) in that order as viewed from the object side. The third lens group (Gr3) is composed of one negative meniscus lens (L5) with a convex surface facing the object side. The fourth lens group (Gr4) is composed of one biconvex positive lens (L6).

In the variable-power optical system 1E having the aforementioned lens configuration in Example 5, when the power varies from the wide-angle end (W) to the telephoto end (T), the second lens group (Gr2) linearly moves toward the object, and the third lens group (Gr3) makes a U-turn to form a convex shape projecting to the object side, as shown in FIG. 16b. In the meantime, the first lens group (Gr1) and fourth lens group (Gr4) are statically positioned. The optical stop (ST) travels together with the second lens group (Gr2) at the time of varying the power.

Tables 10 and 11 show the construction data of each lens in the variable-power optical system 1E of Example 5. As shown in these Tables and FIG. 8, all the lenses (L1 through L6) are designed as bi-aspheric lenses in Example 5. The fifth and sixth lens (L5 and L6) are resin lenses and other lenses are glass lenses.

TABLE 10

| Lens surface | Curvature radius (mm) | On-axis distance between surfaces (mm) | | | Refractive index | Abbe number |
|---|---|---|---|---|---|---|
| | | W | M | T | | |
| r1* | −14.038 | 0.800 | | | 1.68980 | 52.82 |
| r2* | 5.182 | 1.815 | | | | |
| r3* | 8.942 | 1.283 | | | 1.80542 | 26.13 |
| r4* | 25.383 | 8.756 | 4.411 | 0.845 | | |
| r5 (Stop) | ∞ | 0.000 | | | | |
| r6* | 3.907 | 3.000 | | | 1.58913 | 61.24 |
| r7* | −4.921 | 0.117 | | | | |

TABLE 10-continued

| Lens surface | Curvature radius (mm) | On-axis distance between surfaces (mm) | | | Refractive index | Abbe number |
|---|---|---|---|---|---|---|
| | | W | M | T | | |
| r8* | −28.362 | 0.807 | | | 1.80542 | 26.13 |
| r9* | 5.704 | 1.676 | 1.165 | 6.359 | | |
| r10* | 13.652 | 0.750 | | | 1.53048 | 55.72 |
| r11* | 7.022 | 1.270 | 6.126 | 4.498 | | |
| r12* | 13.805 | 1.545 | | | 1.53048 | 55.72 |
| r13* | −29.891 | 3.381 | | | | |
| r14 | ∞ | 0.300 | | | 1.516800 | 64.20 |
| r15 | ∞ | 0.500 | | | | |
| r16 (Image plane) | ∞ | | | | | |

TABLE 11

| Lens surface | Conic constant | Aspheric surface coefficient | | | | | | |
|---|---|---|---|---|---|---|---|---|
| | | A | B | C | D | E | F | G |
| r1 | 0 | 1.57E−03 | 1.95E−04 | −1.93E−05 | 7.17E−07 | −9.70E−09 | −3.17E−11 | 0.00E+00 |
| r2 | 0 | −1.50E−03 | 5.81E−04 | −9.46E−06 | 2.13E−06 | −2.41E−07 | 3.60E−09 | 0.00E+00 |
| r3 | 0 | −2.83E−03 | 5.73E−05 | 3.97E−05 | −2.88E−06 | −6.76E−08 | 7.00E−09 | 0.00E+00 |
| r4 | 0 | −1.93E−03 | −5.78E−06 | 2.23E−05 | −5.71E−07 | −3.36E−07 | 3.02E−08 | −8.00E−10 |
| r6 | 0 | −1.44E−03 | −1.02E−04 | 7.38E−05 | −9.07E−05 | 4.11E−05 | −8.85E−06 | 7.42E−07 |
| r7 | 0 | 7.00E−03 | −2.87E−04 | −3.61E−04 | 2.00E−04 | −5.26E−05 | 8.08E−06 | −5.22E−07 |
| r8 | 0 | 4.88E−04 | 9.04E−04 | −2.83E−04 | 6.00E−05 | 3.37E−06 | −1.16E−06 | 0.00E+00 |
| r9 | 0 | −1.29E−04 | 1.57E−03 | −1.34E−04 | 3.28E−05 | 0.00E+00 | 0.00E+00 | 0.00E+00 |
| r10 | 0 | −2.28E−03 | 1.26E−03 | −2.46E−04 | 2.63E−05 | −1.52E−06 | 2.90E−08 | 0.00E+00 |
| r11 | 0 | −2.29E−03 | 1.16E−03 | −1.72E−04 | 1.19E−05 | −2.52E−07 | −1.45E−08 | 0.00E+00 |
| r12 | −1 | 3.05E−03 | −7.69E−04 | 9.55E−05 | −5.26E−06 | 1.48E−07 | −1.30E−09 | 0.00E+00 |
| r13 | 0 | 4.33E−03 | −1.04E−03 | 1.13E−04 | −5.71E−06 | 1.56E−07 | −1.00E−09 | 0.00E+00 |

Example 6

Figure 9:
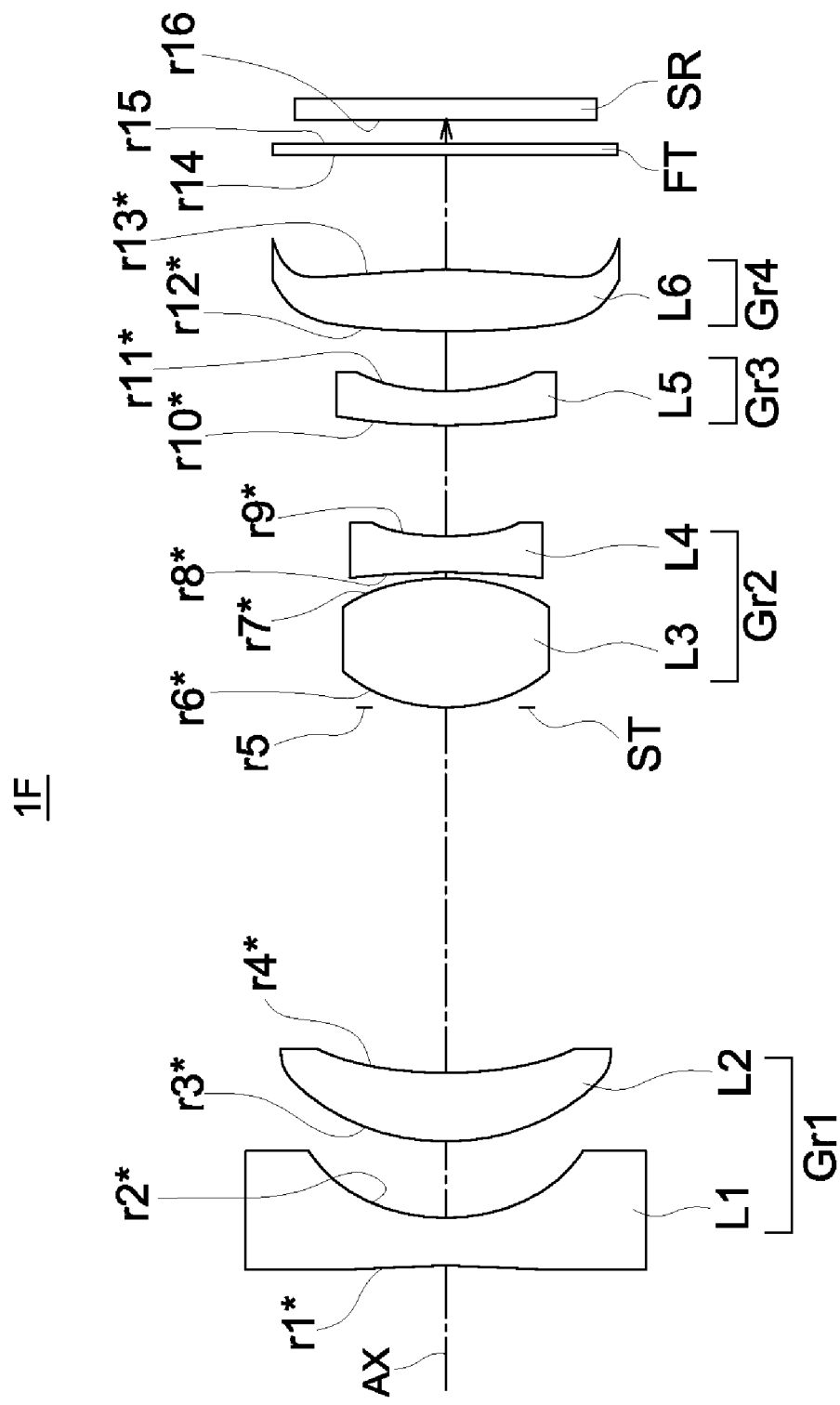
FIG. 9 is a cross sectional view showing the optical path at the wide-angle end of the variable-power optical system relating to Example 6.

FIG. 9 is a cross sectional view traversing the optical axis (AX), representing the arrangement of the lens group in the variable-power optical system 1F of Example 6. The variable-power optical system 1F of Example 6 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) in that order as viewed from the object side. The third lens group (Gr3) is composed of one negative meniscus lens (L5) with a convex surface facing the object side. The fourth lens group (Gr4) is composed of one biconvex positive lens (L6).

In the variable-power optical system 1F having the aforementioned lens configuration in Example 6, when the power varies from the wide-angle end (W) to the telephoto end (T), the second lens group (Gr2) linearly moves toward the object, and the third lens group (Gr3) linearly moves toward the object in the manner of shifting the traveling speed at the intermediate point (M), as shown in FIG. 16c. In the meantime, the first lens group (Gr1) and fourth lens group (Gr4) are statically positioned. The optical stop (ST) travels together with the second lens group (Gr2) at the time of varying the power.

Tables 12 and 13 show the construction data of each lens in the variable-power optical system 1F of Example 6. As shown in these Tables and FIG. 9, all the lenses (L1 through L6) are designed as bi-aspheric lenses. The fifth and sixth lens (L5 and L6) are resin lenses and other lenses are glass lenses.

TABLE 12

| Lens surface | Curvature radius (mm) | On-axis distance between surfaces (mm) | | | Refractive index | Abbe number |
|---|---|---|---|---|---|---|
| | | W | M | T | | |
| r1* | −29.689 | 1.092 | | | 1.68980 | 52.82 |
| r2* | 4.633 | 1.709 | | | | |
| r3* | 5.820 | 1.565 | | | 1.80542 | 26.13 |
| r4* | 9.460 | 8.320 | 4.371 | 0.977 | | |
| r5 (Stop) | ∞ | 0.000 | | | | |
| r6* | 3.951 | 2.970 | | | 1.58913 | 61.24 |
| r7* | −4.279 | 0.100 | | | | |
| r8* | −15.078 | 0.848 | | | 1.80542 | 26.13 |
| r9* | 7.215 | 2.511 | 2.105 | 4.795 | | |
| r10* | 14.185 | 0.750 | | | 1.53048 | 55.72 |
| r11* | 5.364 | 1.371 | 5.726 | 6.430 | | |
| r12* | 39.646 | 1.408 | | | 1.58340 | 30.23 |
| r13* | −14.946 | 2.557 | | | | |
| r14 | ∞ | 0.300 | | | 1.51680 | 64.20 |
| r15 | ∞ | 0.500 | | | | |
| r16 (Image plane) | ∞ | | | | | |

TABLE 13

| Lens surface | Conic constant | Aspheric surface coefficient | | | | | | |
|---|---|---|---|---|---|---|---|---|
| | | A | B | C | D | E | F | G |
| r1 | 0 | −2.98E−04 | 2.29E−04 | −1.96E−05 | 7.12E−07 | −7.70E−09 | −1.00E−10 | 0.00E+00 |
| r2 | 0 | −3.24E−03 | 6.17E−04 | −2.46E−04 | 2.56E−07 | −1.59E−07 | 8.30E−09 | 0.00E+00 |
| r3 | 0 | −2.34E−03 | 2.03E−04 | 1.56E−05 | −2.21E−06 | −3.67E−08 | 7.00E−09 | 0.00E+00 |
| r4 | 0 | −1.33E−03 | 1.35E−04 | 2.05E−05 | −2.39E−06 | −2.79E−07 | 4.47E−08 | −1.40E−09 |
| r6 | 0 | −1.48E−03 | −1.51E−04 | 5.79E−05 | −8.79E−05 | 4.12E−05 | −9.19E−06 | 7.56E−07 |
| r7 | 0 | 7.48E−03 | −6.61E−04 | −4.21E−04 | 2.08E−04 | −5.40E−05 | 7.51E−06 | −3.99E−07 |
| r8 | 0 | −5.20E−04 | 7.05E−04 | −3.13E−04 | 2.64E−05 | 4.22E−06 | −1.78E−07 | 0.00E+00 |
| r9 | 0 | −1.30E−03 | 1.72E−03 | −2.37E−04 | 2.97E−05 | 0.00E+00 | 0.00E+00 | 0.00E+00 |
| r10 | 0 | −4.73E−03 | 1.43E−03 | −2.78E−04 | 2.37E−05 | −3.75E−07 | −1.26E−08 | 0.00E+00 |
| r11 | 0 | −5.13E−03 | 1.50E−03 | −2.43E−04 | 1.37E−05 | 2.62E−07 | 1.02E−08 | 0.00E+00 |
| r12 | −1 | 3.10E−03 | −7.94E−04 | 1.03E−04 | −5.19E−06 | 9.77E−08 | 5.00E−10 | 0.00E+00 |
| r13 | 0 | 5.07E−03 | −1.22E−03 | 1.40E−04 | −6.84E−06 | 1.30E−07 | 1.30E−09 | 0.00E+00 |

FIGS. 11 through 15 show spherical aberration, astigmatism, and distortion of the variable-power optical systems 1B through 1F of the aforementioned Examples 2 through 6, respectively, based on the aforementioned lens arrangements and configurations. Similarly to the case of FIG. 10, in the diagram illustrating the spherical aberration, aberrations at the time of using three beams of light having different wavelengths are shown. Namely, the one-dot chain line indicates a red color, the solid line denotes a yellow color and the broken line represents a blue color. The lens groups of all these Examples exhibit excellent optical characteristics wherein the distortion aberration is kept at 5% or less at any of the wide-angle end (W), intermediate point (M) and telephoto end (T).

Tables 14 and 15 show the focal lengths (in mm) and F values at the wide-angle end (W), intermediate point (M) and telephoto end (T) in each of the variable-power optical systems 1B through 1F in Examples 2 through 6. These Tables demonstrate that an optical system with a short focal length and excellent performance in terms of speed is realized, as in the case of Example 1.

TABLE 14

| | Focal length (mm) | | |
|---|---|---|---|
| | W | M | T |
| Example 1 | 3.8 | 7.5 | 10.7 |
| Example 2 | 5.4 | 9.1 | 14.8 |
| Example 3 | 4.0 | 7.5 | 11.0 |
| Example 4 | 5.7 | 11.4 | 17.1 |
| Example 5 | 4.9 | 8.4 | 13.6 |
| Example 6 | 5.6 | 9.5 | 15.3 |

TABLE 15

| | F value | | |
|---|---|---|---|
| | W | M | T |
| Example 1 | 3.0 | 4.3 | 5.2 |
| Example 2 | 3.3 | 4.5 | 5.8 |
| Example 3 | 3.1 | 4.7 | 6.0 |
| Example 4 | 3.3 | 4.9 | 6.0 |
| Example 5 | 3.3 | 4.5 | 5.9 |
| Example 6 | 3.3 | 4.5 | 5.9 |

Table 16 shows values obtained by applying the aforementioned conditional expressions (1) through (14) to each of the variable-power optical systems 1B through 1F in Examples 2 through 6.

TABLE 16

| | Example 1 | Example 2 | Example 3 | Example 4 | Example 5 | Example 6 |
|---|---|---|---|---|---|---|
| **(1) TLw/TLt | 1.04 | 1.00 | 1.00 | 1.00 | 1.00 | 1.00 |
| **(2) ΔN2 | 0.233 | 0.216 | 0.207 | 0.216 | 0.216 | 0.216 |
| **(3) Δv2 | 49.8 | 35.1 | 53.8 | 35.1 | 35.1 | 35.1 |
| **(4) Lb/fw | 0.65 | 0.43 | 0.36 | 1.20 | 0.82 | 0.58 |
| **(5) f2/fw | 1.86 | 1.34 | 1.49 | 1.30 | 1.52 | 1.24 |
| **(6) |f3/fw| | 35.79 | 4.01 | 2.18 | 5.34 | 5.74 | 3.01 |
| **(7) |D3/(fw × ft)$^{1/2}$| | 0.23 | 0.42 | 1.00 | 0.53 | 0.39 | 0.55 |
| **(8) h1/TLw | 0.21 | 0.15 | 0.14 | 0.15 | 0.17 | 0.16 |
| **(9) T1/(fw × ft)$^{1/2}$ | 0.65 | 0.42 | 1.30 | 0.41 | 0.48 | 0.47 |
| **(10) T12/(fw × ft)$^{1/2}$ | 0.24 | 0.07 | 0.09 | 0.06 | 0.10 | 0.11 |
| **(11) EPw/fw | 2.01 | 2.26 | 3.09 | 1.70 | 2.40 | 1.99 |
| **(12) |f1n/f1p| | 0.31 | 0.33 | 0.19 | 0.25 | 0.33 | 0.36 |
| **(13) |f2n/f2p| | 1.54 | 1.63 | 1.95 | 2.09 | 1.38 | 1.48 |
| **(14) f2/ft | 0.65 | 0.49 | 0.54 | 0.44 | 0.55 | 0.45 |

**Conditional expression

As described above, according to the variable-power optical systems 1A through 1F of Examples 1 through 6, it is possible to provide a less expensive zoom lens that permits satisfactory correction of various forms of aberrations over the entire variable-power region, and ensures extremely compact configuration particularly in the variable-power optical system having a variable-power ratio of about 2 to 4 times.

The invention claimed is:

1. A variable-power optical system comprising, in order from an object side thereof:
   a first lens group with a negative optical power;
   a second lens group with a positive optical power; and
   a third lens group with a negative optical power; and
   a fourth lens group with a positive optical power,
   wherein an interval between the first lens group and the second lens group decreases when a power of the variable-power optical system varies from a wide-angle end to a telephoto end,
   the first lens group comprises a negative lens and a positive lens,
   the second lens group consists of a positive lens and a negative lens, and includes at least one aspheric surface, and
   the variable-power optical system satisfies the following expressions (1) through (4):

$$TLw/TLt < 1.2, \qquad (1)$$

$$\Delta N2 > 0.15, \qquad (2)$$

$$\Delta v2 > 20, \text{ and} \qquad (3)$$

$$Lb/fw \leq 1.2, \qquad (4)$$

where TLw and TLt are distances on an optical axis from a tip of a lens surface to an image plane, at a wide-angle end (w) and a telephoto end (t) respectively, when an object is placed at an infinite distance, the lens surface being arranged at a closest position to the object side in the variable-power optical system,
ΔN2 is a difference in refractive indexes of lenses in the second lens group,
Δv2 is a difference in Abbe numbers of lenses in the second lens group,
Lb is a distance on the optical axis from a tip of a lens surface with a power to the image plane at the telephoto end, the lens surface with a power being arranged at a closest position to an image side in the variable-power optical system, wherein the distance on the optical axis is calculated on the assumption that air is present as a medium in an area between the lens surface with a power and the image plane, and fw is a composite focal length of a total optical system of the variable-power optical system at the wide-angle end, wherein the variable-power optical system adjusts a focal point from an object at an infinite distance to an object to a near distance by moving the third lens group toward the image side, and variable-power optical system satisfies the expression (6):

$$1.5<|f3/fw|<6.0, \quad (6)$$

where f3 is a composite focal length of the third lens group, and wherein the second lens group satisfies the expression (5):

$$0.6<f2/fw<2.0, \quad (5)$$

where f2 is a composite focal length of the second lens group.

2. The variable-power optical system of claim 1, wherein the third lens group moves to form a locus in a convex shape projecting to the object side, when the power varies from the wide-angle end to the telephoto end, and the variable-power optical system satisfies the expression (7):

$$|D3/(fw \times ft)^{1/2}|<1.5, \quad (7)$$

where D3 is a displacement amount of the third lens group when the power varies from the wide-angle end to the telephoto end, and ft is a composite focal length of the total optical system at the telephoto end.

3. The variable-power optical system of claim 1, wherein the first lens group is statically positioned when the power varies from the wide-angle end to the telephoto end, and the variable-power optical system satisfies the expression (8):

$$0.1<h1/TLw, \quad (8)$$

where h1 is a radius of an effective optical path of a lens surface arranged at a closest position to the object side in the variable-power optical system, at the wide-angle end.

4. The variable-power optical system of claim 1, wherein the first lens group and an interval between the first lens group and the second lens group satisfies the expressions (9) and (10):

$$0.2<T1/(fw \times ft)^{1/2}<1.5, \quad (9)$$

$$T12/(fw \times ft)^{1/2}<0.3, \quad (10)$$

where T1 is an axial thickness from a front lens surface of the first lens group to a rear lens surface of the first lens group, ft is a composite focal length of the total optical system at the telephoto end, and T12 is an axial interval between the first lens group and the second lens group at the telephoto end.

5. The variable-power optical system of claim 1, further comprising:

an aperture stop arranged on the object side of the second lens group, wherein an aperture diameter of the aperture stop is fixed.

6. The variable-power optical system of claim 5, further comprising:

a device adjusting a light amount arranged on the image side of the second lens group.

7. The variable-power optical system of claim 1, wherein the fourth lens group is statically positioned when the power varies from the wide-angle end to the telephoto end and satisfies the expression (11):

$$1.0<|EPw/fw|<8.0, \quad (11)$$

where EPw is a distance from an exit pupil position of a principal ray of a maximum angle of view to the image plane, at the wide-angle end.

8. The variable-power optical system of claim 1, wherein the variable-power optical system consists of four lens groups.

9. The variable-power optical system of claim 1, wherein only two lens groups including a lens group for varying the power and a lens group for correcting a shift of the image plane due to zooming, are movable when the power varies.

10. The variable-power optical system of claim 1, wherein the first lens group consists of a negative lens and a positive lens in order from the object side, and satisfies the expression (12):

$$0.15<|f1n/f1p|<0.50, \quad (12)$$

where f1p is a focal length of the positive lens in the first lens group, and f1n is a focal length of the negative lens in the first lens group.

11. The variable-power optical system of claim 1, wherein the second lens group consists of a positive lens and a negative lens in order from the object side, and satisfies the expression (13):

$$1.0<|f2n/f2p|<2.5, \quad (13)$$

where f tp is a focal length of the positive lens in the second lens group, and f2n is a focal length of the negative lens in the second lens group.

12. The variable-power optical system of claim 1, wherein the variable-power optical system includes at least one lens made of a resin material.

13. The variable-power optical system of claim 12, wherein the lens made of a resin material is a lens formed with a material in which particles with a maximum size of 30 nm or less are dispersed into a resin material.

14. The variable-power optical system of claim 1, wherein the variable-power optical system comprises a positive lens in the fourth lens group or in a lens group arranged closer to the image side than the fourth lens group, and the positive lens is made of a resin material.

15. An image pickup device, comprising:

a variable-power optical system of claim 1, and an image pickup element converting an optical image to electric signal, wherein the variable-power optical system is capable of forming an optical image of an object onto a light receiving surface of the image pickup element.

16. A digital apparatus comprising:

an image pickup device of claim 15, and a controller for capturing at least one of a still image and a moving image, wherein a variable-power optical system in the image pickup device is mounted thereto so as to be capable of forming an optical image of an object onto a light receiving surface of an image pickup element.

17. The digital apparatus of claim 16, wherein the digital apparatus is a mobile terminal.

* * * * *